(12) United States Patent
Bachman et al.

(10) Patent No.: US 10,031,660 B2
(45) Date of Patent: Jul. 24, 2018

(54) MEDIA PLAYER PLAYLIST MANAGEMENT

(71) Applicant: Apple Inc., Cupertino, CA (US)

(72) Inventors: William M. Bachman, San Jose, CA (US); Brian R. Frick, Gaithersburg, MD (US); Timothy B. Martin, Morgan Hill, CA (US); Jeffrey L. Robbin, Los Altos, CA (US); Christopher J. Sanders, San Jose, CA (US)

(73) Assignee: APPLE INC., Cupertino, CA (US)

( * ) Notice: Subject to any disclaimer, the term of this patent is extended or adjusted under 35 U.S.C. 154(b) by 239 days.

(21) Appl. No.: 14/977,499

(22) Filed: Dec. 21, 2015

(65) Prior Publication Data

US 2016/0110050 A1 Apr. 21, 2016

Related U.S. Application Data

(63) Continuation of application No. 13/893,072, filed on May 13, 2013, now Pat. No. 9,218,118.

(60) Provisional application No. 61/699,788, filed on Sep. 11, 2012, provisional application No. 61/699,758, filed on Sep. 11, 2012.

(51) Int. Cl.
| | |
|---|---|
| *G06F 3/048* | (2013.01) |
| *G06F 3/0486* | (2013.01) |
| *G06F 3/0482* | (2013.01) |
| *G11B 27/034* | (2006.01) |
| *G11B 27/34* | (2006.01) |
| *G06F 17/30* | (2006.01) |

(52) U.S. Cl.
CPC .......... *G06F 3/0486* (2013.01); *G06F 3/0482* (2013.01); *G06F 17/30778* (2013.01); *G11B 27/034* (2013.01); *G11B 27/34* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 4,464,652 A | 8/1984 | Lapson et al. | |
| 4,555,775 A | 11/1985 | Pike | |

(Continued)

FOREIGN PATENT DOCUMENTS

| | | |
|---|---|---|
| EP | 0483777 | 5/1992 |
| EP | 0514307 A3 | 11/1992 |

(Continued)

OTHER PUBLICATIONS

Notice of Allowance, dated Sep. 26, 2016, received in U.S. Appl. No. 14/096,717, 8 pages.

(Continued)

*Primary Examiner* — Peiyong Weng
(74) *Attorney, Agent, or Firm* — Morgan, Lewis & Bockius LLP

(57) ABSTRACT

Embodiments of the present disclosure relate to techniques for enabling easy generation, editing, and access to digital content compilations, such as playlists, etc. Specifically, embodiments of the present disclosure employ one or more graphical user-interfaces that provide a playlist toolbar (e.g., a sidebar) after determining a user wishes to access a digital content compilation. Further, predictions may be made to determine potential activities associated with these compilations based upon previous actions performed by the user.

39 Claims, 13 Drawing Sheets

(56) References Cited

U.S. PATENT DOCUMENTS

| | | |
|---|---|---|
| 4,653,020 A | 3/1987 | Cheselka et al. |
| 4,688,167 A | 8/1987 | Agarwal |
| 4,689,737 A | 8/1987 | Grant |
| 4,712,191 A | 12/1987 | Penna |
| RE32,632 E | 3/1988 | Atkinson |
| 4,769,636 A | 9/1988 | Iwami et al. |
| 4,780,709 A | 10/1988 | Randall |
| 4,783,648 A | 11/1988 | Homma et al. |
| 4,819,189 A | 4/1989 | Kikuchi et al. |
| 4,831,556 A | 5/1989 | Oono |
| 4,862,389 A | 8/1989 | Takagi |
| 4,899,136 A | 2/1990 | Beard et al. |
| 5,008,853 A | 4/1991 | Bly et al. |
| 5,040,131 A | 8/1991 | Torres |
| 5,060,170 A | 10/1991 | Bourgeois et al. |
| 5,107,443 A | 4/1992 | Smith et al. |
| 5,140,677 A | 8/1992 | Fleming et al. |
| 5,140,678 A | 8/1992 | Torres |
| 5,146,556 A | 9/1992 | Hullot et al. |
| 5,202,828 A | 4/1993 | Vertelney et al. |
| 5,293,476 A | 3/1994 | Wolber et al. |
| 5,305,435 A | 4/1994 | Bronson |
| 5,313,575 A | 5/1994 | Beethe |
| 5,325,481 A | 6/1994 | Hunt |
| 5,343,409 A | 8/1994 | Satterfield et al. |
| 5,347,628 A | 9/1994 | Brewer et al. |
| 5,371,844 A | 12/1994 | Andrew et al. |
| 5,384,911 A | 1/1995 | Bloomfield |
| 5,386,564 A | 1/1995 | Shearer et al. |
| 5,412,776 A | 5/1995 | Bloomfield et al. |
| 5,422,993 A | 6/1995 | Fleming |
| 5,428,734 A | 6/1995 | Haynes et al. |
| 5,438,662 A | 8/1995 | Randall |
| 5,442,795 A | 8/1995 | Levine et al. |
| 5,546,520 A | 8/1996 | Cline et al. |
| 5,546,527 A | 8/1996 | Fitzpatrick et al. |
| 5,579,469 A | 11/1996 | Pike |
| 5,583,984 A | 12/1996 | Conrad et al. |
| 5,598,524 A | 1/1997 | Johnston, Jr. et al. |
| 5,638,504 A | 6/1997 | Scott et al. |
| 5,638,505 A | 6/1997 | Hemenway et al. |
| 5,652,876 A | 7/1997 | Ashe et al. |
| 5,657,049 A | 8/1997 | Ludolph et al. |
| 5,657,463 A | 8/1997 | Bingham |
| 5,680,562 A | 10/1997 | Conrad et al. |
| 5,714,971 A | 2/1998 | Shalit et al. |
| 5,724,532 A | 3/1998 | Thomson |
| 5,737,737 A | 4/1998 | Hikida et al. |
| 5,742,286 A | 4/1998 | Kung et al. |
| 5,745,096 A | 4/1998 | Ludolph et al. |
| 5,745,111 A | 4/1998 | Cline et al. |
| 5,751,287 A | 5/1998 | Hahn et al. |
| 5,754,174 A | 5/1998 | Carpenter et al. |
| 5,754,178 A | 5/1998 | Johnston, Jr. et al. |
| 5,760,775 A | 6/1998 | Sklut et al. |
| 5,767,834 A | 6/1998 | Vouri et al. |
| 5,771,032 A | 6/1998 | Cline et al. |
| 5,801,702 A | 9/1998 | Dolan et al. |
| 5,825,348 A | 10/1998 | Ludolph et al. |
| 5,825,349 A | 10/1998 | Meier et al. |
| 5,835,094 A | 11/1998 | Ermel et al. |
| 5,886,697 A | 3/1999 | Naughton et al. |
| 5,956,030 A | 9/1999 | Conrad et al. |
| 5,999,178 A | 12/1999 | Hwang et al. |
| 6,034,621 A | 3/2000 | Kaufman |
| 6,061,061 A | 5/2000 | Conrad et al. |
| 6,097,389 A | 8/2000 | Morris et al. |
| 6,121,967 A | 9/2000 | Foster et al. |
| 6,133,898 A | 10/2000 | Ludolph et al. |
| 6,147,687 A | 11/2000 | Wanderski |
| 6,177,935 B1 | 1/2001 | Munn |
| 6,188,404 B1 | 2/2001 | Rekimoto |
| 6,195,094 B1 | 2/2001 | Celebiler |
| 6,208,344 B1 | 3/2001 | Holzman et al. |
| 6,225,920 B1 | 5/2001 | Dayle |
| 6,252,597 B1 | 6/2001 | Lokuge |
| 6,295,541 B1 | 9/2001 | Bodnar et al. |
| 6,307,545 B1 | 10/2001 | Conrad et al. |
| 6,310,633 B1 | 10/2001 | Graham |
| 6,317,739 B1 | 11/2001 | Hirata et al. |
| 6,335,742 B1 | 1/2002 | Takemoto |
| 6,341,280 B1 | 1/2002 | Glass et al. |
| 6,356,915 B1 | 3/2002 | Chtchetkine et al. |
| 6,356,971 B1 | 3/2002 | Katz et al. |
| 6,363,400 B1 | 3/2002 | Chtchetkine et al. |
| 6,411,311 B1 | 6/2002 | Rich et al. |
| 6,430,576 B1 | 8/2002 | Gates et al. |
| 6,433,801 B1 | 8/2002 | Moon et al. |
| 6,470,341 B1 | 10/2002 | Rekimoto |
| 6,496,206 B1 | 12/2002 | Mernyk et al. |
| 6,546,393 B1 | 4/2003 | Khan |
| 6,571,245 B2 | 5/2003 | Huang et al. |
| 6,590,568 B1 | 7/2003 | Astala et al. |
| 6,636,250 B1 | 10/2003 | Gasser |
| 6,642,944 B2 | 11/2003 | Conrad et al. |
| 6,664,983 B2 | 12/2003 | Ludolph |
| 6,691,138 B1 | 2/2004 | Kirkpatrick et al. |
| 6,711,291 B1 | 3/2004 | Stubler et al. |
| 6,741,996 B1 | 5/2004 | Brechner et al. |
| 6,750,886 B1 | 6/2004 | Bergstedt |
| 6,751,604 B2 | 6/2004 | Barney et al. |
| 6,784,925 B1 | 8/2004 | Tomat et al. |
| 6,823,344 B1 | 11/2004 | Isensee et al. |
| 6,823,348 B2 | 11/2004 | Benayoun et al. |
| 6,859,210 B2 | 2/2005 | Luo et al. |
| 6,910,052 B2 | 6/2005 | Gates et al. |
| 6,915,489 B2 | 7/2005 | Gargi |
| 6,924,827 B1 | 8/2005 | Gulati et al. |
| 6,928,621 B2 | 8/2005 | Conrad et al. |
| 6,956,562 B1 | 10/2005 | O'Hara et al. |
| 6,966,033 B1 | 11/2005 | Gasser et al. |
| 7,089,256 B2 | 8/2006 | Smialek |
| 7,096,454 B2 | 8/2006 | Damm et al. |
| 7,117,453 B2 | 10/2006 | Drucker et al. |
| 7,120,735 B1 | 10/2006 | Summers et al. |
| 7,149,729 B2 | 12/2006 | Kaasten et al. |
| 7,162,466 B2 | 1/2007 | Kaasten et al. |
| 7,171,468 B2 | 1/2007 | Yeung et al. |
| 7,293,242 B2 | 11/2007 | Cossey et al. |
| 7,320,109 B1 | 1/2008 | Zeevi et al. |
| 7,334,190 B2 | 2/2008 | Wierowski |
| 7,337,409 B2 | 2/2008 | Doblmayr et al. |
| 7,346,766 B2 | 3/2008 | MacKin et al. |
| 7,353,232 B1 | 4/2008 | Kalucha et al. |
| 7,434,170 B2 | 10/2008 | Novak et al. |
| 7,461,346 B2 | 12/2008 | Fildebrandt |
| 7,472,350 B2 | 12/2008 | Hintermeister et al. |
| 7,496,583 B2 | 2/2009 | Moore et al. |
| 7,549,126 B2 | 6/2009 | Conrad et al. |
| 7,565,618 B2 | 7/2009 | Sheasby et al. |
| 7,607,102 B2 | 10/2009 | Ording et al. |
| 7,665,028 B2 | 2/2010 | Cummins et al. |
| 7,739,604 B1 | 6/2010 | Lyons et al. |
| 7,788,579 B2 | 8/2010 | Berkner et al. |
| 7,956,845 B2 | 6/2011 | Lee |
| 7,958,119 B2 | 6/2011 | Eggink et al. |
| 8,050,496 B2 | 11/2011 | Pan et al. |
| 8,181,119 B1 | 5/2012 | Ording |
| 8,589,492 B2 | 11/2013 | Scholz |
| 8,645,489 B1 | 2/2014 | Riggins et al. |
| 8,650,500 B2 | 2/2014 | Soderberg et al. |
| 2001/0018715 A1 | 8/2001 | Stern et al. |
| 2001/0024212 A1 | 9/2001 | Ohnishi |
| 2001/0042042 A1 | 11/2001 | Stokes et al. |
| 2002/0018051 A1 | 2/2002 | Singh |
| 2002/0059288 A1 | 5/2002 | Yagi et al. |
| 2002/0075312 A1 | 6/2002 | Amadio et al. |
| 2002/0075330 A1 | 6/2002 | Rosenzweig et al. |
| 2002/0091697 A1 | 7/2002 | Huang et al. |
| 2002/0097277 A1 | 7/2002 | Pitroda |
| 2002/0107892 A1 | 8/2002 | Chittu et al. |
| 2002/0154176 A1 | 10/2002 | Barksdale et al. |
| 2002/0161777 A1 | 10/2002 | Smialek |

(56) References Cited

U.S. PATENT DOCUMENTS

| | | | |
|---|---|---|---|
| 2002/0196271 A1* | 12/2002 | Windl | G06F 3/0486 715/734 |
| 2002/0198909 A1 | 12/2002 | Huynh et al. | |
| 2003/0007007 A1 | 1/2003 | Hinegardner et al. | |
| 2003/0050713 A1 | 3/2003 | Piersanti et al. | |
| 2003/0063126 A1* | 4/2003 | Yanchar | G06F 3/0481 715/781 |
| 2003/0069931 A1 | 4/2003 | Omura et al. | |
| 2003/0076322 A1 | 4/2003 | Ouzts et al. | |
| 2003/0079038 A1 | 4/2003 | Robbin et al. | |
| 2003/0081011 A1 | 5/2003 | Sheldon et al. | |
| 2003/0084096 A1 | 5/2003 | Starbuck et al. | |
| 2003/0093466 A1 | 5/2003 | Jarman et al. | |
| 2003/0107601 A1 | 6/2003 | Ryzhov | |
| 2003/0126136 A1 | 7/2003 | Omoigui | |
| 2003/0158975 A1 | 8/2003 | Frank et al. | |
| 2003/0160825 A1 | 8/2003 | Weber | |
| 2003/0184587 A1 | 10/2003 | Ording et al. | |
| 2003/0190590 A1 | 10/2003 | Lumsden et al. | |
| 2003/0222913 A1 | 12/2003 | Mattila et al. | |
| 2003/0222915 A1 | 12/2003 | Marion et al. | |
| 2004/0004638 A1 | 1/2004 | Babaria | |
| 2004/0021643 A1 | 2/2004 | Hoshino et al. | |
| 2004/0044723 A1 | 3/2004 | Bell et al. | |
| 2004/0056839 A1 | 3/2004 | Yoshihara | |
| 2004/0070608 A1 | 4/2004 | Saka | |
| 2004/0095390 A1 | 5/2004 | Arning et al. | |
| 2004/0119763 A1 | 6/2004 | Mizobuchi et al. | |
| 2004/0177319 A1 | 9/2004 | Horn | |
| 2004/0189695 A1 | 9/2004 | Kurtz et al. | |
| 2004/0205711 A1 | 10/2004 | Ishimitsu et al. | |
| 2004/0220899 A1 | 11/2004 | Barney et al. | |
| 2005/0050301 A1 | 3/2005 | Whittle et al. | |
| 2005/0071780 A1 | 3/2005 | Muller et al. | |
| 2005/0076305 A1 | 4/2005 | Hintermeister et al. | |
| 2005/0080807 A1 | 4/2005 | Beilinson et al. | |
| 2005/0097477 A1 | 5/2005 | Camara et al. | |
| 2005/0108297 A1 | 5/2005 | Rollin et al. | |
| 2005/0132304 A1 | 6/2005 | Guido et al. | |
| 2005/0165825 A1 | 7/2005 | Turski et al. | |
| 2005/0188174 A1 | 8/2005 | Guzak et al. | |
| 2005/0197961 A1 | 9/2005 | Miller et al. | |
| 2005/0246313 A1 | 11/2005 | Turski et al. | |
| 2005/0246637 A1 | 11/2005 | Knight et al. | |
| 2005/0246640 A1 | 11/2005 | Lacy | |
| 2005/0246721 A1 | 11/2005 | Scholz | |
| 2005/0275636 A1 | 12/2005 | Dehlin et al. | |
| 2006/0036568 A1 | 2/2006 | Moore et al. | |
| 2006/0070007 A1 | 3/2006 | Cummins et al. | |
| 2006/0146765 A1 | 7/2006 | Van De Sluis et al. | |
| 2006/0174216 A1 | 8/2006 | Peterson et al. | |
| 2006/0195462 A1 | 8/2006 | Rogers | |
| 2006/0259875 A1 | 11/2006 | Collins et al. | |
| 2006/0282790 A1 | 12/2006 | Matthews et al. | |
| 2006/0294476 A1 | 12/2006 | Buckley | |
| 2007/0038610 A1 | 2/2007 | Omoigui | |
| 2007/0081197 A1 | 4/2007 | Omoigui | |
| 2007/0088672 A1 | 4/2007 | Kaasten et al. | |
| 2007/0168388 A1 | 7/2007 | Plastina et al. | |
| 2007/0186241 A1 | 8/2007 | Sugimoto et al. | |
| 2007/0256009 A1 | 11/2007 | Jung | |
| 2008/0036743 A1 | 2/2008 | Westerman et al. | |
| 2008/0052371 A1 | 2/2008 | Partovi et al. | |
| 2008/0120501 A1 | 5/2008 | Jannink et al. | |
| 2008/0177640 A1 | 7/2008 | Gokturk et al. | |
| 2008/0189656 A1 | 8/2008 | Abanami et al. | |
| 2008/0227440 A1 | 9/2008 | Settepalli | |
| 2008/0295012 A1* | 11/2008 | Sloo | G06F 3/0486 715/769 |
| 2009/0037449 A1* | 2/2009 | Fagans | G06F 17/3028 |
| 2009/0049082 A1 | 2/2009 | Slaney et al. | |
| 2009/0150388 A1 | 6/2009 | Roseman et al. | |
| 2009/0178008 A1 | 7/2009 | Herz et al. | |
| 2010/0042654 A1 | 2/2010 | Heller et al. | |
| 2010/0076983 A1 | 3/2010 | Gates et al. | |
| 2010/0088605 A1 | 4/2010 | Livshin et al. | |
| 2010/0092085 A1 | 4/2010 | Marchesotti | |
| 2010/0185671 A1 | 7/2010 | Burba et al. | |
| 2010/0246591 A1 | 9/2010 | Gobriel et al. | |
| 2011/0216966 A1 | 9/2011 | Cok et al. | |
| 2011/0234613 A1 | 9/2011 | Hanson et al. | |
| 2011/0246939 A1 | 10/2011 | Kasahara et al. | |
| 2011/0252346 A1 | 10/2011 | Chaudhri | |
| 2011/0252349 A1 | 10/2011 | Chaudhri | |
| 2011/0252350 A1 | 10/2011 | Chaudhri | |
| 2011/0252372 A1 | 10/2011 | Chaudhri | |
| 2011/0252373 A1 | 10/2011 | Chaudhri | |
| 2011/0252374 A1 | 10/2011 | Chaudhri | |
| 2011/0252375 A1 | 10/2011 | Chaudhri | |
| 2011/0265035 A1 | 10/2011 | Lepage et al. | |
| 2012/0027294 A1 | 2/2012 | Krolczyk et al. | |
| 2012/0030005 A1 | 2/2012 | Gupta | |
| 2012/0036139 A1 | 2/2012 | Okamoto et al. | |
| 2012/0054666 A1 | 3/2012 | Baird-Smith et al. | |
| 2012/0072832 A1 | 3/2012 | Tanaka | |
| 2012/0143718 A1 | 6/2012 | Graham et al. | |
| 2012/0299942 A1 | 11/2012 | Braun et al. | |
| 2012/0313962 A1 | 12/2012 | Hsu et al. | |
| 2012/0317123 A1 | 12/2012 | Green et al. | |
| 2013/0044123 A1 | 2/2013 | Shah et al. | |
| 2013/0057566 A1 | 3/2013 | Kriese et al. | |
| 2013/0066819 A1 | 3/2013 | Nice et al. | |
| 2014/0025619 A1 | 1/2014 | Michelstein et al. | |
| 2014/0075313 A1 | 3/2014 | Bachman et al. | |
| 2014/0075314 A1 | 3/2014 | Bachman et al. | |
| 2014/0075324 A1 | 3/2014 | Howard et al. | |
| 2014/0208250 A1 | 7/2014 | Ording et al. | |
| 2014/0223357 A1 | 8/2014 | Ording et al. | |

FOREIGN PATENT DOCUMENTS

| | | |
|---|---|---|
| FR | 2693810 | 6/1991 |
| TW | 201135578 A | 10/2011 |
| WO | WO 89/11694 | 11/1989 |
| WO | WO 2007119927 A1 | 10/2007 |
| WO | WO 2011109181 A1 | 9/2011 |

OTHER PUBLICATIONS

Notice of Allowance, dated Aug. 30, 2016, received in U.S. Appl. No. 14/204,977, 10 pages.
Notice of Allowance, dated Sep. 23, 2016, received in U.S. Appl. No. 13/890,888, 12 pages.
Ray et al., "Mac OS X: Unleashed," USA, Nov. 2001, 182 pages.
Final Office Action, dated Feb. 1, 2016, received in U.S. Appl. No. 14/096,717, 15 pages.
Chavanu, "Use iTunes Genius Mixes as Your Personal Music DJ," http://www.makeuseof.com/tag/itunesgeniusmixespersonalmusicdj/>, Aug. 18, 2010, 6 pages.
Office Action, dated Apr. 11, 2016, received in U.S. Appl. No. 14/204,977, 17 pages.
Final Office Action, dated Mar. 10, 2016, received in U.S. Appl. No. 13/890,888, 15 pages.
Apple Computer, "Inside Macintosh," Apple Technical Library, Chapter 6, Dec. 1992, 26 pages.
U.S. Appl. No. 14/096,717, filed Dec. 4, 2013, 54 pages.
Cohen, et al., "Color Harmonization," Tel Aviv University, Jan. 1, 2006, 7 pages.
Conner, "Using iTunes 10," Feb. 2011, Que Publishing, 19 pages.
Cowart, "Mastering Windows 3.1," Sybex Inc., 1992, 46 pages.
Dong, "Chameleon: Color Transformation on OLED Displays," Department of Electrical & Computer Engineering, Rice University, Houston TX, May 2012, 1 page.
Duntemann, "Complete Turbo Pascal," Scott, Foresman and Company, Third Edition, Nov. 8, 1994, 33 pages.
IBM Corp., "Automatic Window Management Mode," IBM Technical Disclosure Bulletin, vol. 35, No. 4B, Sep. 1992, 1 page.
IBM Corp., "Developer's Desktop," IBM Technical Disclosure Bulletin, vol. 33, No. 6B, Nov. 1990, 4 pages.

(56) References Cited

OTHER PUBLICATIONS

IBM Corp. "Notebook Tabs as Target Location for Drag/Drop Operations," IBM Technical Disclosure Bulletin, vol. 35, No. 7, Dec. 1992, 1 page.
INPI, "Preliminary Research Report," No. 9206603000, INPI, Feb. 2, 1996, 3 pages.
International Search Report and Written Opinion, dated Jan. 2, 2014, received in International Patent Application No. PCT/US2013/054364, 12 pages.
International Preliminary Report on Patentability, dated Mar. 17, 2015, received in International Patent Application No. PCT/US2013/054364, 9 pages.
Johnson, et al., "The Xerox Star: A Retrospective", Scott, Foresman and Company, Sep. 21, 1989, 18 pages.
Johnston, "Window Shade Version 1.1 Program," Interactive Technologies, Inc., Stuart Florida, Oct. 28, 1989, 2 pages.
Lam et al., "The NewWave Office," Hewlett-Packard Journal, Aug. 30, 1990, vol. 40, No. 4, 10 pages.
Mander et al., "A Pile Metaphor for Supporting Casual Organization of Information," ACM Conference on Human Factors in Computing Systems (CHI '92 Conference Proceedings): Striking a Balance (May 3, 1992, 9 pages.
Meier, "ACE: A Color Expert System for User Interface Design," Department of Comuper Science, Brown University, Jan. 3, 1988, 12 pages.
Microsoft Corporation, "Microsoft Windows™ User Guide," Microsoft Corporation, 1985-1990, Verson 3.0, 3 pages.
Microsoft Corporation, "Microsoft Windows™ Program Manager," Screen Dumps from Microsoft Windows™ V. 3.1, Microsoft Corporation, 1985-1992, 14 pages.
Myers, "Window Interfaces, A Taxonomy of Window Manager User Interfaces.," IEEE Computer Graphics and Applications, Sep. 1, 1988, 20 pages.
Office Action, dated Jun. 18, 2015, received in U.S. Appl. No. 13/893,031, 13 pages.
Office Action, dated May 20, 2015, received in Taiwanese Patent Application No. 102131693, 4 pages.
Pogue, et al., MacOSX: The Missing Manual, Panther Edition, 2003, 232 pages.
Shebanek, "The Complete Guide to the NextStep User Environment," Sep. 23, 1993, 114 pages.
Tanner, "iTunes Guide, A beginners guide to the iTunes," the Maccast Lemon Productions, Dec. 14, 2006, 3 pages.
The NeXt™, "User's Reference Manual", c1989, by NeXtTM, Inc., 10 pages.
Tyne, "Thinking Person's Guide to OS.2.2.1," John Wiley & Sons Inc., Oct. 29, 1993, 8 pages.
"Using Desktop and Drawers to Predefine Path," Research Disclosure, No. 312, Apr. 1990, 1 page.
"Virtual Office Desktop Drawers," Research Disclosure No. 305, Sep. 1989, 1 page.
Viticci, "Web-based, Social iTunes Store Launching Next Week?", MacStories, http://www.macstories.net/news/web-based-social-itunes-store-launching-next-week/>, Aug. 26, 2010, 4 pages.
Wikipedia.org., "Macintosh Finder Software," retrieved from the Internet, Jul. 2009, 8 pages.
Williams, et al. "The Robin Williams MAC OS X book, Jaguar Edition", Dec. 26, 2002, 173 pages.
WWW.Cocoatech.com et al., "Path Finder in a Flash", http://web.archive.org/web/20040505134139;/cocoatech.com/manual/html/flash.html, May 5, 2004, 33 pages.
Office Action, dated Jun. 27, 2007, received in U.S. Appl. No. 10/873,661, 18 pages.
Office Action, dated Dec. 31, 2007, received in U.S. Appl. No. 10/873,661, 17 pages.
Final Office Action, dated Jul. 10, 2008, received in U.S. Appl. No. 10/873,661, 22 pages.
Office Action, dated Feb. 17, 2009, received in U.S. Appl. No. 10/873,661, 23 pages.
Office Action, dated Aug. 3, 2009, received in U.S. Appl. No. 10/873,661, 23 pages.
Final Office Action, dated Mar. 8, 2010, received in U.S. Appl. No. 10/873,661, 29 pages.
Office Action, dated Jun. 7, 2013, received in U.S. Appl. No. 10/873,661, 10 pages.
Office Action, dated Apr. 23, 2015, received in U.S. Appl. No. 14/096,717, 7 pages.
Office Action, dated Jul. 8, 2014, received in U.S. Appl. No. 14/204,977, 26 pages.
Final Office Action, dated Feb. 2, 2015, received in U.S. Appl. No. 14/204,977, 22 pages.
Office Action, dated Jul. 2, 2015, received in U.S. Appl. No. 13/890,888, 19 pages.
Office Action, dated Apr. 9, 2015, received in U.S. Appl. No. 13/893,072, 31 pages.
Notice of Allowance, dated Aug. 21, 2015, received in U.S. Appl. No. 13/893,072, 7 pages.

\* cited by examiner

MEDIA PLAYER PLAYLIST MANAGEMENT

CROSS-REFERENCE TO RELATED APPLICATIONS

This application is a continuation of U.S. application Ser. No. 13/893,072, filed May 13, 2013, which claims the benefit of priority to U.S. Provisional Application Ser. No. 61/699,788, filed Sep. 11, 2012, entitled "Integrated Content Recommendation," and U.S. Provisional Application Ser. No. 61/699,758, filed Sep. 11, 2012, entitled "Automated Graphical User-Interface Layout," all of which are incorporated herein by reference in their entirety.

BACKGROUND

The present disclosure relates generally to a graphical user-interface, and, more particularly, to a graphical user-interface for generating playlists of content provided in a digital content player.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As the prevalence of electronic devices has increased, content, such as movies, music, images, etc., has largely become available in a digital format, displayable by these electronic devices. Accordingly, digital content players for electronic devices have become very prevalent. Unfortunately, as digital content offerings increase, so does the complexity of organizing this content in the content players.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for generating content playlists via a graphical user-interface of a digital content player. In some embodiments, the digital content player may offer enhanced playlist functionality, such as easier access, generation, and editing of the playlist. Additionally, the digital content player may remember previous actions of a user of the digital content player and suggest potential playlist generation activities based upon those previous actions. Accordingly, users of the digital content player may more easily generate, edit, and access playlists within the digital content player.

BRIEF DESCRIPTION OF THE DRAWINGS

Various aspects of this disclosure may be better understood upon reading the following detailed description and upon reference to the drawings in which:

FIG. 7 is a view illustrating an example of content added to the playlist sidebar of FIG. 6;

FIG. 10 is a view illustrating content added to a previously created playlist via the "Add to" sidebar of FIG. 9, in accordance with an embodiment;

FIG. 11 is a view of the playlist sidebar of FIG. 6, provided based upon the actions illustrated in FIG. 10, in accordance with an embodiment;

FIG. 12 is a view illustrating a sort menu for the playlist sidebar of FIG. 6, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique allows for enhanced access, generation, and editing of playlists in a digital content player via a graphical user-interface of the digital content player. For example, a content player, such as the iTunes® application, available from Apple Inc. of Cupertino, Calif., may perform the playlist generation functionalities described herein. The digital content player and the functions described herein may be implemented as machine-readable instructions stored on a tangible, non-transitory, computer-readable medium.

Figure 1:
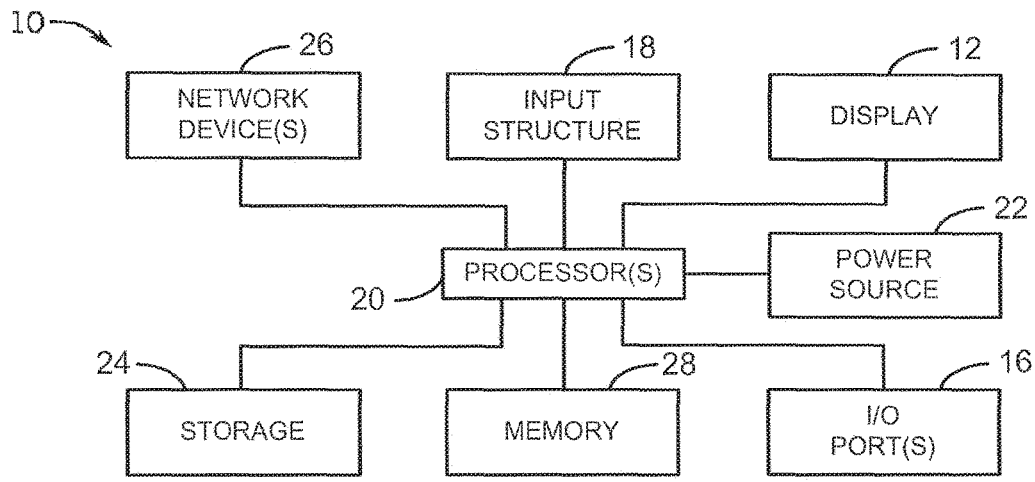
FIG. 1 is a block diagram of components of an electronic device, in accordance with an embodiment.
Figure 2:
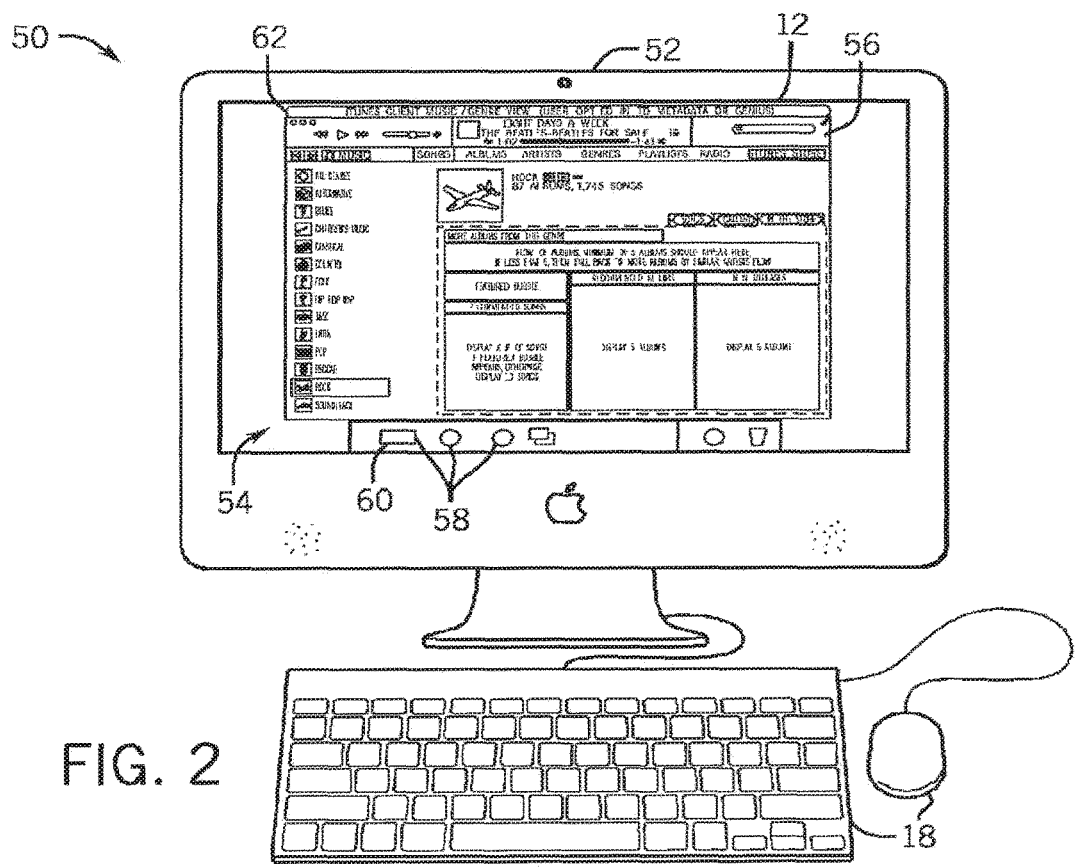
FIG. 2 is a schematic diagram of an example of an electronic device, in accordance with an embodiment.

With these foregoing features in mind, a general description of suitable electronic devices for implementing aspects of the present techniques are described below. In FIG. 1, a block diagram depicting various components that may be present in electronic devices suitable for use with the present techniques is provided. In FIG. 2, one example of a suitable electronic device, here provided as a desktop computer, is depicted. This type of electronic device, and other electronic devices providing comparable storage and/or processing capabilities, may be used in conjunction with the present techniques. For example, these and similar types of electronic devices may be used to display the playlist toolbar (e.g., a sidebar) and/or the "Add to" toolbar, as described herein.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. The various functional blocks shown in FIG. 1 may comprise hardware elements (including circuitry), software elements (including computer code stored on a machine-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 16, input structures 18, one or more processors 20, a memory device 22, a non-volatile storage 24, a networking device 26, and a power source 28.

With regard to each of these components, the display 12 may be used to display various images generated by the device 10. The display 12 may be any type of display such as a cathode ray tube (CRT), a liquid crystal display (LCD), a light emitting diode (LED) display, an organic light emitting diode (OLED) display, or other suitable display. Additionally, in certain embodiments of the electronic device 10, the display 12 may include a touch-sensitive element, such as a touch screen.

The I/O ports 16 may include ports configured to connect to a variety of external devices, such as a power source or other electronic devices (such as handheld devices and/or computers, printers, projectors, external displays, modems, docking stations, and so forth). The I/O ports 16 may support any interface type, such as a universal serial bus (USB) port, a video port, a serial connection port, a IEEE-1394 port, an Ethernet or modem port, and/or an AC/DC power connection port.

The input structures 18 may include the various devices, circuitry, and pathways by which user input or feedback is provided to the processor 20. Such input structures 18 may be configured to control a function of the device 10 when actuated. For example, the input structures 18 may include buttons, sliders, switches, control pads, keys, knobs, scroll wheels, keyboards, mice, touchpads, and so forth.

In certain embodiments, an input structure 18 and display 12 may be provided together, such as in the case of a touchscreen where a touch sensitive mechanism is provided in conjunction with the display 12. In such embodiments, the user may select or interact with displayed interface elements via the touch sensitive mechanism. In this way, the displayed user interface may provide interactive functionality, allowing a user to select, by touch screen or other input structure, from among options displayed on the display 12.

User interaction with the input structures 18, such as to interact with a user or application interface displayed on the display 12, may generate electrical signals indicative of the user input. These input signals may be routed via suitable pathways, such as an input hub or bus, to the processor(s) 20 for further processing.

The processor(s) 20 may provide the processing capability to execute the operating system, programs, user and application interfaces, and any other functions of the electronic device 10. The processor(s) 20 may include one or more microprocessors, such as one or more "general-purpose" microprocessors, one or more special-purpose microprocessors and/or ASICS, or some combination of such processing components. For example, the processor 20 may include one or more reduced instruction set (RISC) processors, as well as graphics processors, video processors, audio processors and/or related chip sets.

The instructions or data to be processed by the processor(s) 20 may be stored in a memory 22. The memory 22 may be provided as a volatile memory, such as random access memory (RAM), and/or as a non-volatile memory, such as read-only memory (ROM). The memory 22 may store a variety of information and may be used for various purposes. For example, the memory 22 may store firmware for the electronic device 10 (such as a basic input/output instruction or operating system instructions), other programs that enable various functions of the electronic device 10, user interface functions, processor functions, and may be used for buffering or caching during operation of the electronic device 10.

The components may further include a non-volatile storage 24 for persistent storage of data and/or instructions. The non-volatile storage 24 may include flash memory, a hard drive, or any other optical, magnetic, and/or solid-state storage media. The non-volatile storage 24 may be used to store data files such as personal information, software (e.g., an application used to play digital content on the electronic device 10 or on another electronic device), wireless connection information (e.g., information that may enable the electronic device 10 to establish a wireless connection, such as a telephone or wireless network connection), and any other suitable data.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The network device 26 may allow the electronic device 10 to communicate over a network, such as a Local Area Network (LAN), Wide Area Network (WAN), or the Internet. Further, the electronic device 10 may connect to and send or receive data with any device on the network, such as portable electronic devices, personal computers, printers, and so forth. Alternatively, in some embodiments, the electronic device 10 may not include a network device 26. In such an embodiment, a NIC may be added as an expansion card to provide similar networking capability as described above.

Further, the components may also include a power source 28. In one embodiment, the power source 28 may be one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. This power adapter may also be used to recharge one or more batteries if present.

FIG. 2 illustrates an electronic device 10 in the form of a desktop computer 50, such as an iMac® by Apple Inc., that may be used to generate and/or present the enhanced playlist functions described herein. It should be noted that while the techniques will be described below in reference to illustrated electronic device 50 (which may be a desktop computer), the techniques described herein are usable with any electronic device employing a display. For example, other electronic devices may include a laptop computer, a tablet computer, a viewable media player, a mobile phone, a personal data organizer, a workstation, a standalone display, or the like. In certain embodiments, the electronic device may include a model of an iMac®, Mac® mini, Mac Pro®, MacBook®, a MacBook® Pro, MacBook Air®, Apple Cinema Display®, Apple Thunderbolt Display®, iPad®, iPod® or iPhone® available from Apple Inc. of Cupertino, California. In other embodiments, the electronic device may include other models and/or types of electronic devices, available from any manufacturer.

As illustrated in FIG. 2, the desktop computer 50 includes a housing 52 that supports and protects interior components, such as processors, circuitry, and controllers, among others, that may be used to generate images to display on display 12. The desktop computer 50 also includes user input structures 18, shown here as a keyboard and a mouse, that may be manipulated by a user to interact with desktop computer 50. For example, the user input structures 18 may be employed to operate a graphical user interface (GUI) 54 of an operating system running on the desktop computer 50 as well as a GUI 56 of applications running on desktop computer 50. Input structures 18 may be connected to the electronic device 10 through a wired or wireless configuration. Further, in certain embodiments, electronic device 10 may include other types of user input structures, such as a touchscreen or trackpad, among others.

The GUI 54 may include various layers, windows, screens, templates, or other graphical elements that may be displayed in all, or a portion, of the display 12. Generally, the GUI 54 may include graphical elements 58 that represent applications and functions of the electronic device. The graphical elements 58 may include icons and other images representing buttons, sliders, menu bars, and the like. The icons may correspond to various applications of the electronic device that may open upon selection of a respective icon. Furthermore, selection of an icon may lead to a hierarchical navigation process, such that selection of an icon leads to a screen that includes one or more additional icons or other GUI elements 58. The icons may be selected via a touch screen included in the display 12, or may be selected by a user input structure 18, such as a wheel or button.

When an icon is selected, the desktop computer 50 may be configured to open an application associated with that icon and display a corresponding screen. For example, when the "iTunes" icon 60 is selected, the desktop computer 50 may be configured to open an application GUI 56 for the iTunes® application.

As discussed herein, the GUI 56 may include enhanced playlist functionality that enables easier creation, editing, and access to playlists. The playlists are compilations of digital content (e.g., music, movies, television shows, etc.). For example, the processor 20 of the desktop computer 50 may detect actions by a user in the GUI 56 and provide a playlist editing tool (e.g., a playlist sidebar) in the GUI 56 based upon those actions. Further, the processor 20 may suggest playlist actions, such as adding content to a particular playlist, based upon previously detected actions. While the current disclosure will refer to the playlist editing tool as a "playlist sidebar," it should be understood that the playlist editing tool is not limited to a sidebar implementation. For example, the playlist editing tool could be provided at the top, bottom, or other area of the GUI 56.

Figure 3:
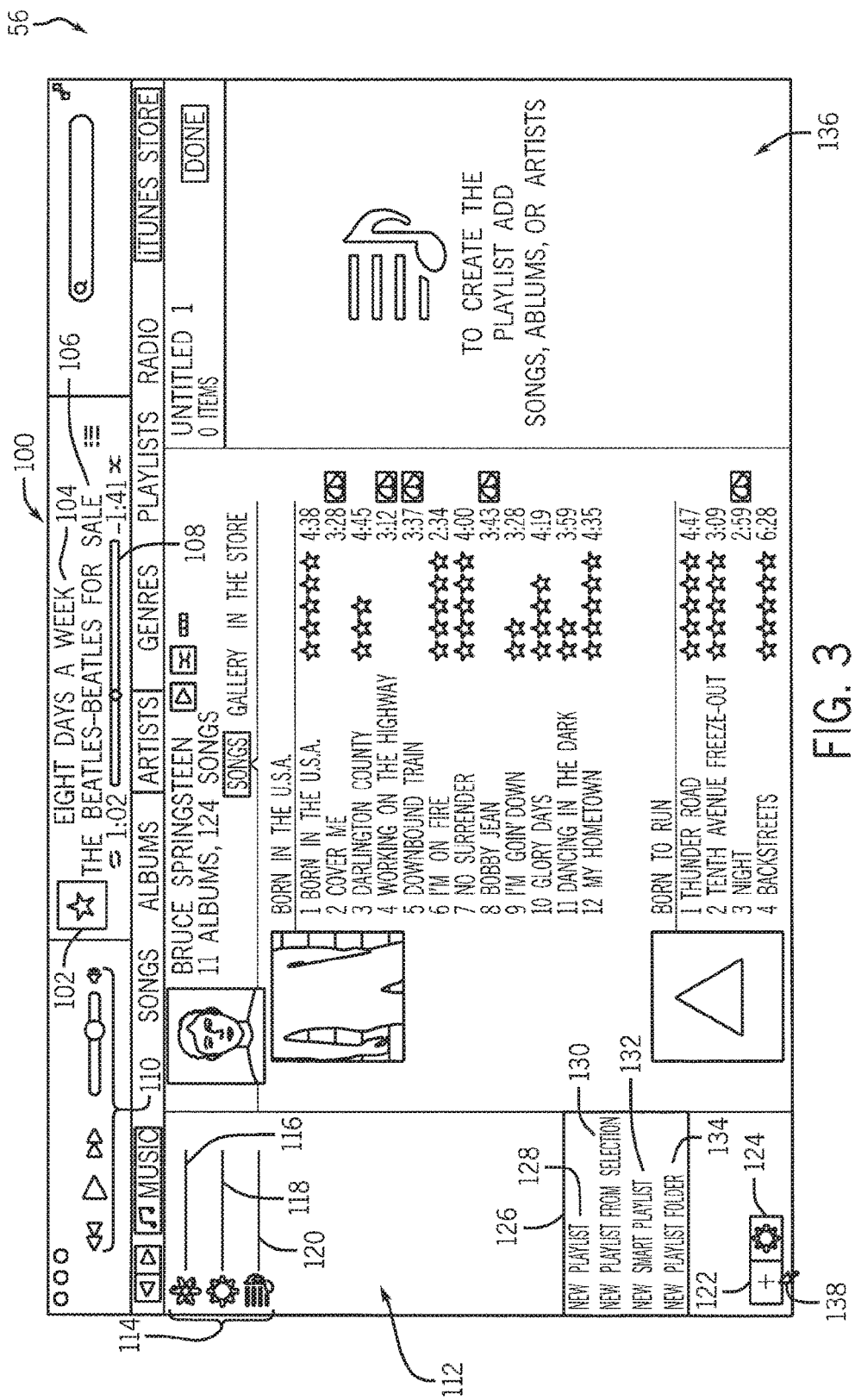
FIG. 3 is a schematic view of a digital content player providing a menu to add items associated with a playlist, in accordance with an embodiment.

FIG. 3 illustrates an embodiment of GUI 56 of FIG. 2. GUI 56 may include a currently playing box 100 that provides information regarding content that is currently being played in the digital content player application. For example, such information may include artwork 102, a title 104, and/or artist and album information 106. Further, the currently playing box 100 may include playtime indicator 108 that indicates a time position of the current playback. Additionally, the GUI 56 may include playback controls 110 for the currently playing content, such as fast-forward, re-wind, skip forward, skip backward, play, pause, and/or volume controls.

A library sidebar 112 may also be displayed in the GUI 56. The library sidebar 112 may display playlists 114 that are available in the digital content player. As discussed above, playlists are compilations of content available in the digital content player. These playlists 114 may be generated automatically for a user or may be manually created by the user of the digital content player. For example, the playlists 114 may include playlists 116 generated based upon content obtained by the user (e.g., Genius ® playlists by Apple, Inc.). Further the playlists may include smart playlists 118, which may be automatically generated based upon attributes of content/activities associated with the content that are known by the digital content player. For example, smart playlist 118 might include content of a particular genre, decade, most often played, recently added, recently played, etc. The playlists 114 may also include manually configured playlists 120 that are defined by the user of the digital content player.

Additionally, the library sidebar 112 may include a new icon 122 for creating new items in library sidebar 112 and configuration or edit icons 124 for editing items in the library sidebar 112. As illustrated in FIG. 3, when a user selects the new icon 122, a new menu 126 may appear. As illustrated, the new menu 126 may include an option 128 for creating a new playlist, an option 130 for creating a new playlist from a selection, an option 132 for creating a new smart playlist, and an option 134 for creating a playlist folder. When selecting option 128, an empty manually configured playlist 120 may be created for manual configuration by the user. When selecting option 130, any selected content (e.g., selections made in the content list view 136) may be used to generate a playlist 116 automatically. Alternatively, the selections may be added to a new manually configured playlist 120. When option 132 is selected, a new smart playlist 118 may be generated. Further, as will be illustrated in more detail with regards to FIG. 9, when option 134 is selected, a playlist folder may be generated. The playlist folder may store one or more playlists defined in the digital content library.

Assuming the user selected the new icon 122 and selected the new playlist option 128, as indicated by the mouse pointers 138, a new playlist may be generated by the content player. In the current embodiment, as will be seen in FIG. 4, a default name for the playlist is "Untitled 1." In alternative embodiments, the default playlist names may be some alternative name such as "playlist 1," "Joe's playlist 1," where Joe is the user creating the playlist, etc.

Figure 4:
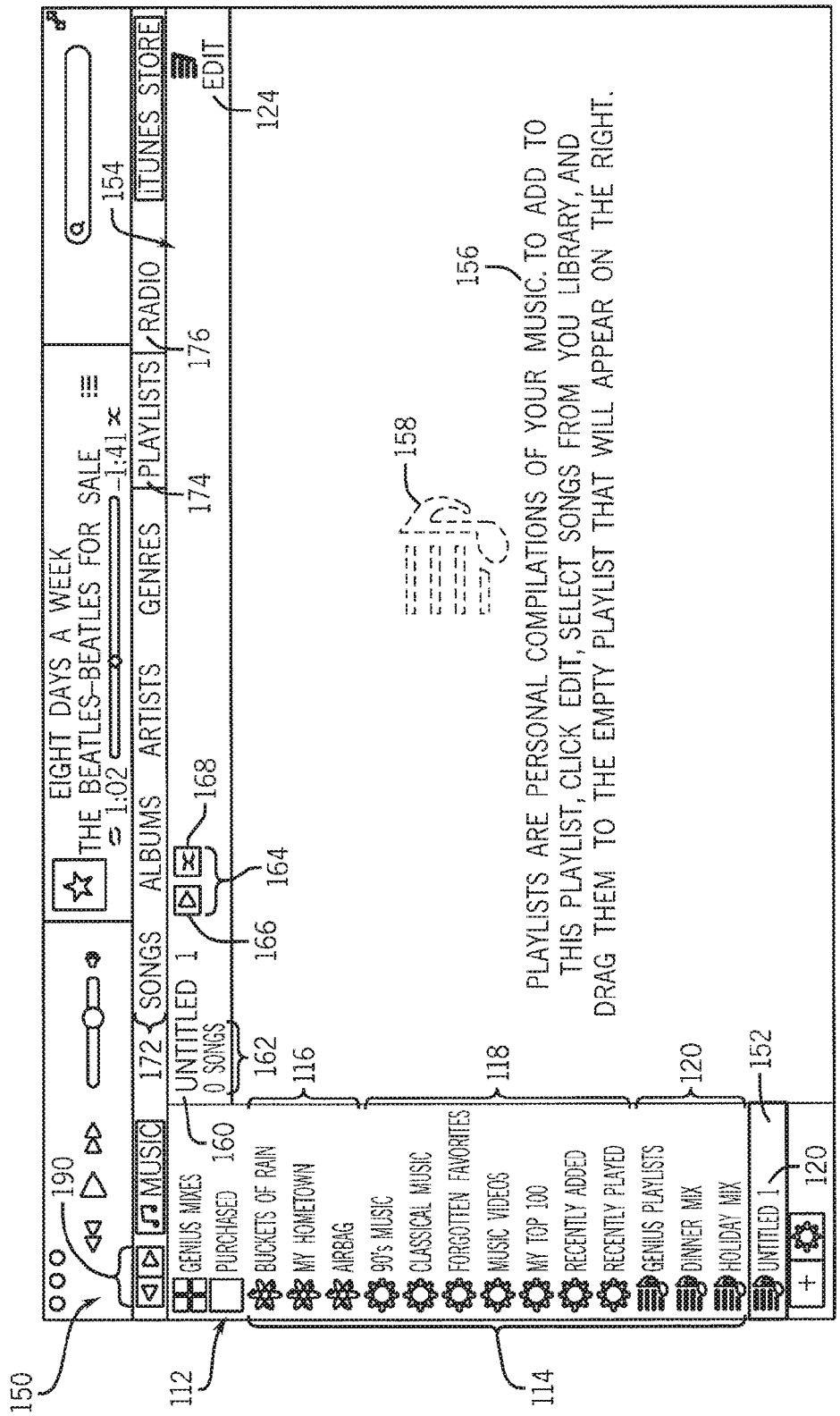
FIG. 4 is a schematic view of a playlist screen for a newly created playlist, in accordance with an embodiment.

Having now created a new playlist, the playlist may be accessed and/or edited via the digital content player. FIG. 4 is a schematic view of a playlist screen 150 for the newly created manual configured playlist 120 "Untitled 1." The playlist screen 150 may be accessed by selecting a playlist 114 in the library sidebar 112. For example, as illustrated, the selection bar 152 indicates that "Untitled 1" is currently selected. Accordingly, the playlist screen 150 may provide a view 154 associated with the selected playlist. When the playlist is empty (e.g., does not have any content associated with it), a playlist instruction 156 may be provided. Further, an icon 158 may be provided as an indicator that the current playlist is a manually configured playlist 120. Further, the title 160, a content count 162, and playlist controls 164, such as a play button 166 and/or shuffle button 168 may be provided.

The user may be directed off of the playlist screen 150 in one of many ways. For example, navigation buttons 190 may provide navigation away from the screen 150. Further, as illustrated, one or more tabs 172 may be provided. When a user selects a tab other than the playlists tab 174, the user may be directed to a view corresponding to that tab 172. For example, the user may select the radio tab 176 and be directed to a radio view.

Figure 5:
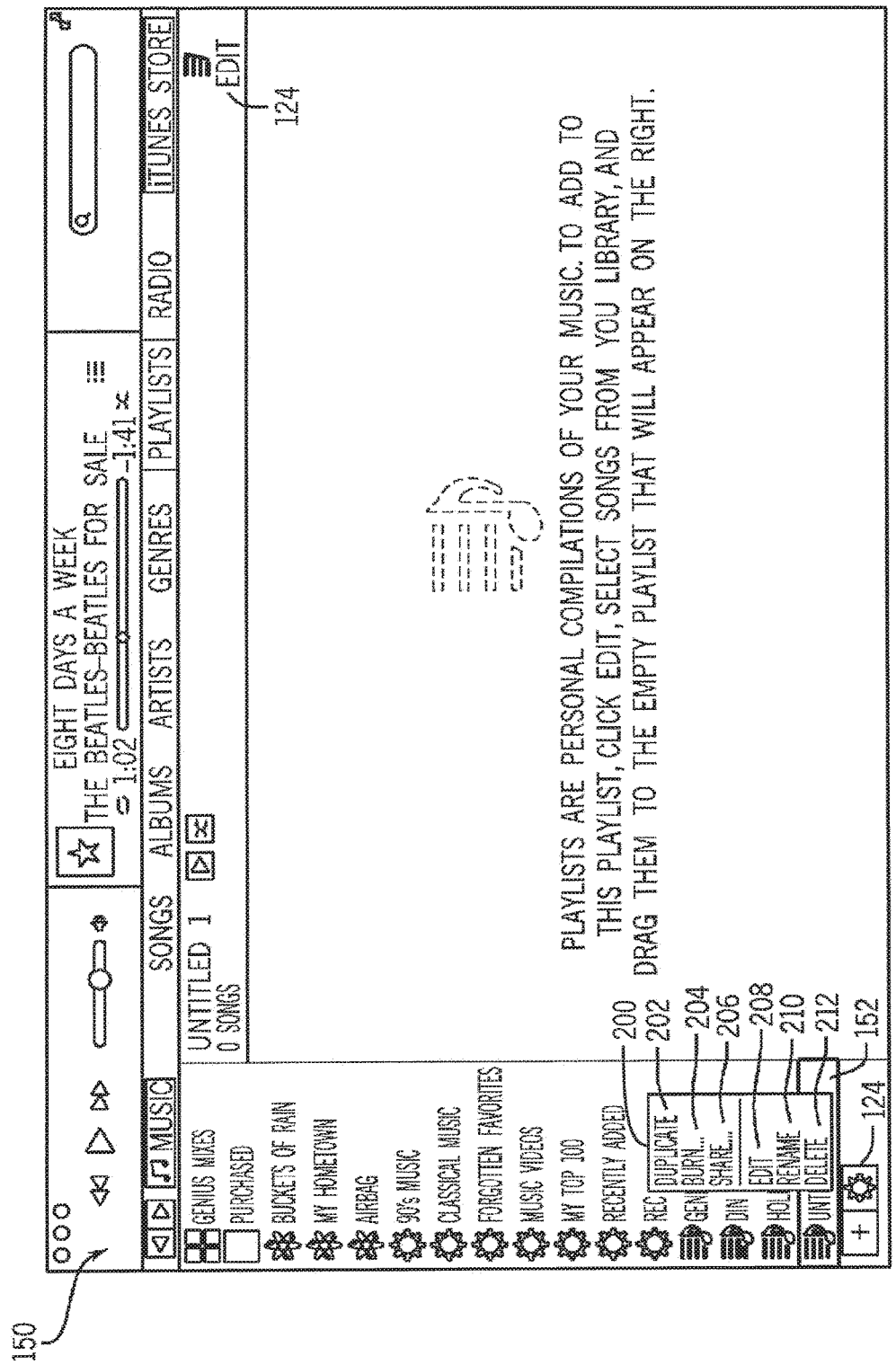
FIG. 5 is a schematic view of an edit menu associated with a playlist, in accordance with an embodiment.

Once the manually configured playlist 120 is created, the playlist 120 may be edited. For example, FIG. 5 is an illustration of the screen 150 providing an edit menu 200 associated with a playlist, in accordance with an embodiment. When a user selects one of the edit icon 124, an edit menu 200 may be provided. The edit menu 200 may include an option 202 to duplicate the currently selected playlist (e.g., the playlist indicated by selection bar 152). Further a burn option 204 and/or a share option 206 may be provided. The burn option 204 may enable the content in the selected playlist to be copied to a storage device external to the digital content player (e.g., a writable DVD, a universal serial bus hard drive, etc.). The share option 206 may enable the playlist to be shared with others (e.g., via social networking sites, email, etc.). An edit option 208 may enable the content associated with the playlist to be altered. For example, new content may be added, existing content may be removed, and/or the order of the content may be modified. A rename option 210 may enable the playlist name to be changed. For example, the default name "Untitled 1" may not be a desired name for the playlist, so the user may modify the name using the rename option 210. A delete option 212 enables the user to delete the currently selected playlist.

Figure 6:
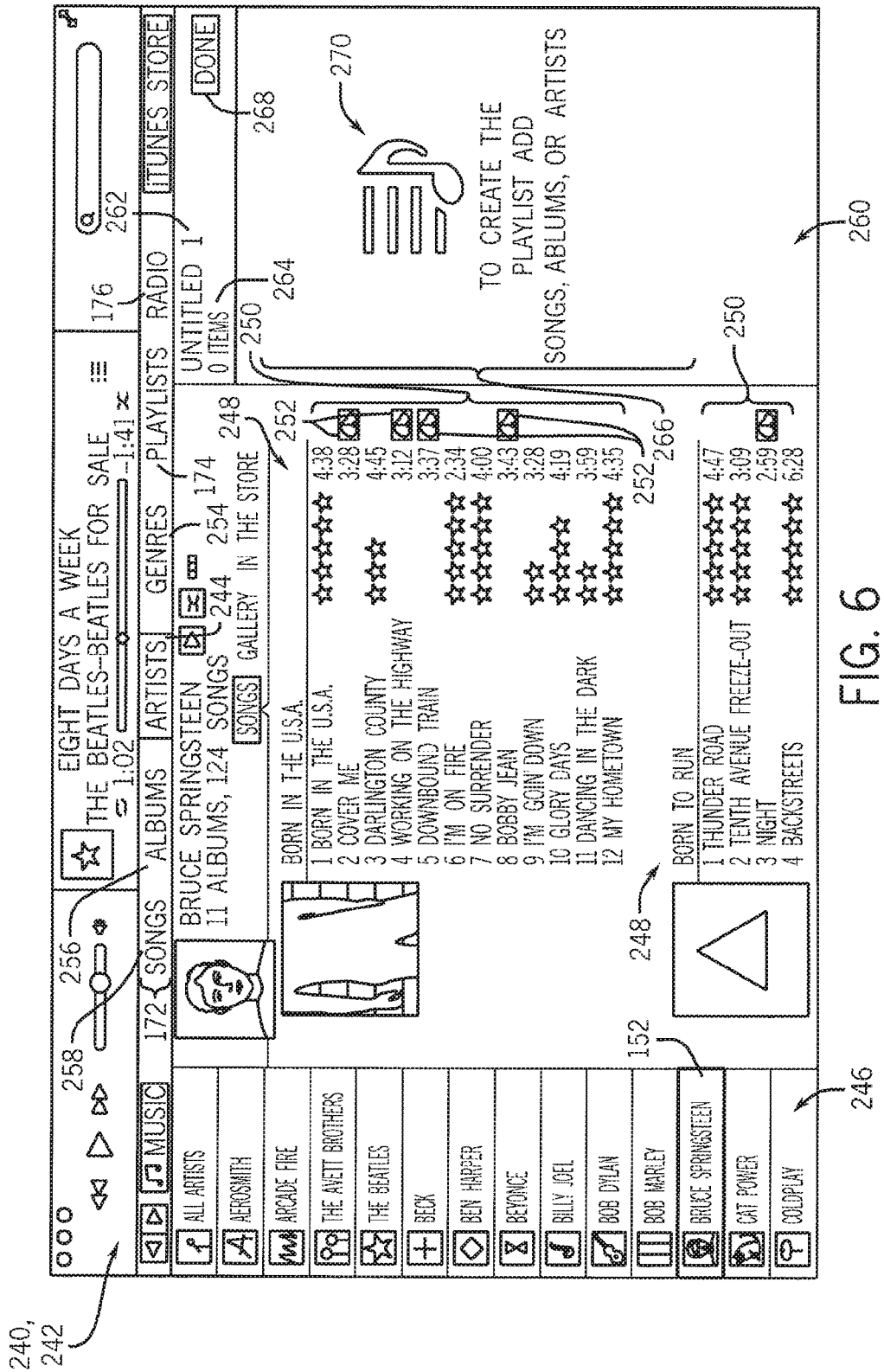
FIG. 6 is a view of a playlist sidebar for adding content to a playlist, in accordance with an embodiment.

Using option 210 of the edit menu 200, assume the user renames the playlist "Untitled 1" to "Road Tunes." When the user selects the edit option 208, the user may be directed to a different view that enables content to be added to the "Road Tunes" playlist. FIG. 6 illustrates a content view 240 that includes a listing of current content available to be added to playlists. For instance, in the current example, an artists view 242 is provided based upon the selection of an artists tab 244. The artists view 242 may display the user's digital content based upon artist association. For example, a library sidebar 246 may provide a list of artists that the user has in their content library. When the user selects a particular artist (e.g., "Bruce Springsteen," as indicated by the selection bar 152) the content stored by the digital content player corresponding to that artist is displayed. For example, associated albums 248 and content 250 may be provided. In some embodiments, content that is not already acquired by the user may be provided. For example, an acquisition icon 252 may be provided next to content that has not already been acquired by the user.

Even though the current example of the content view 240 illustrates an artists view 242, many other implementations are possible. For example, a genres tab 254 could present the content based upon genres associated with content, an albums tab 256 could present the content based upon album titles associated with the content, a songs tab 258 could present the content based upon song title, etc. Because the user reached the content view 240 via a playlist edit option (e.g., option 208 of FIG. 5), the content view 240 may present a playlist sidebar 260 that may enable editing of a playlist.

As discussed above, in this example, the user renamed the "Untitled 1" playlist to "Road Tunes" and then selected an option to edit the "Road Tunes" playlist. Accordingly, the provided playlist sidebar 260 is associated with the "Road Tunes" playlist. As will be discussed in more detail below, there are additional ways a user might reach a playlist edit option (e.g., a tool bar menu option or a quick menu option). Accordingly, the playlist sidebar 260 may be provided in any one of a number of ways.

The playlist sidebar 260 may include a title 262 indicating the name of the playlist that is currently editable. Further, a count 264 of the content (e.g., number of pieces of content, total time of the content, etc.) may be provided. A content container area 266 may be provided, which displays the current content associated with the playlist. Additionally, an edit completion button 268 (e.g., a "Done" button) may be provided to close editing of the playlist and hide the playlist sidebar 260.

In the current example, the user has not yet added any content to the "Road Tunes" playlist. Accordingly, the count 264 is "0 items" and the content container area 266 does not indicate any content associated with the playlist. In some embodiments, when the content container area 266 is empty, background text and/or a background image 270 may provide instructions on adding content to the playlist.

Figure 7:
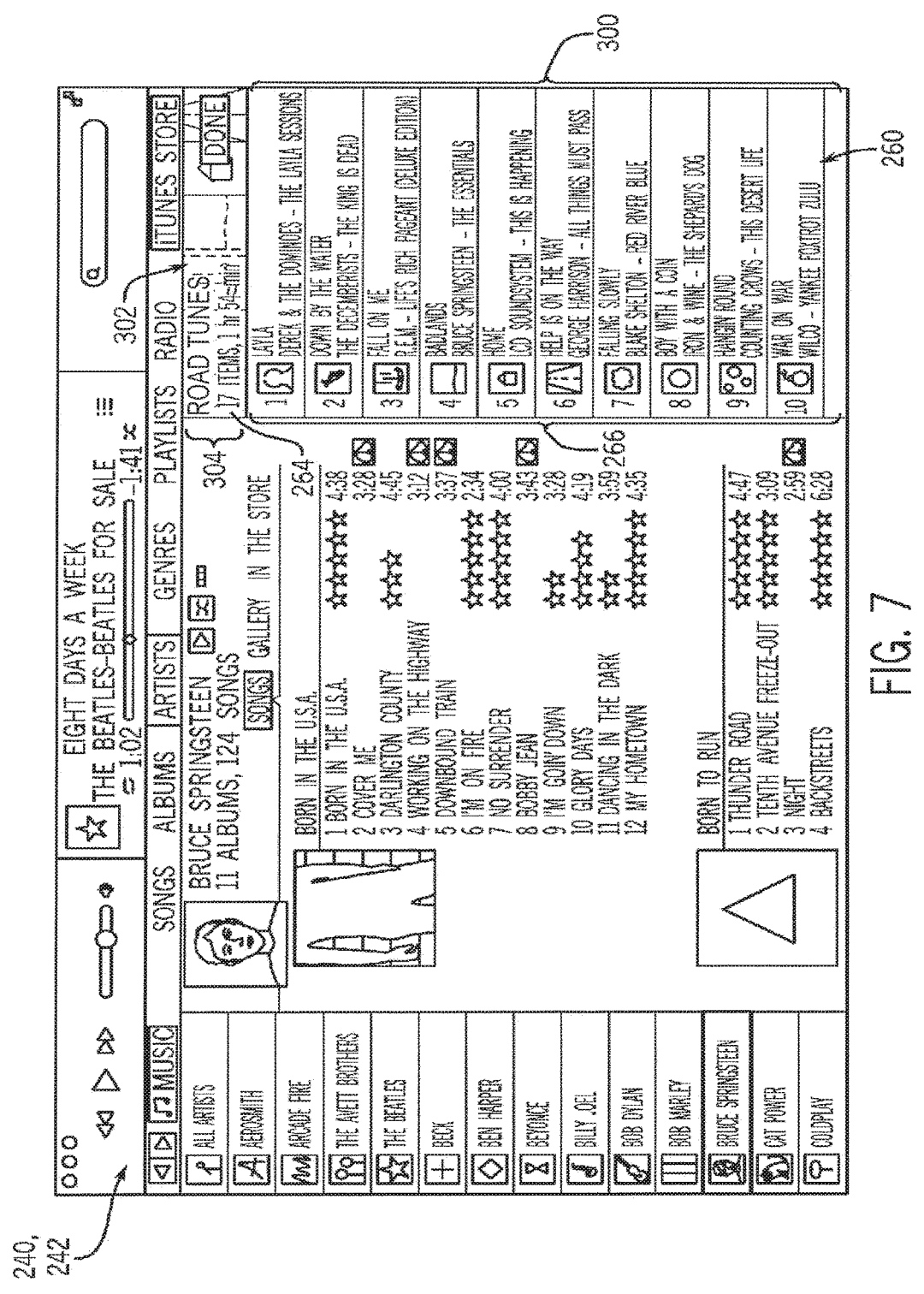

To add content to the playlist, the user may drag content from the artists view 242 (or other view displayed based upon the currently selected tab 172) into the content container area 266 of the playlist sidebar 260. As illustrated in FIG. 7, the user has placed an assortment of content 300 in the content container area 266, thus associating the content with the "Road Tunes" playlist. As the assortment of content 300 is associated with the playlist, the count 264 may update. For example, as illustrated, the number of items has increased to 17 and the time counter has increased to 1 hour and 54 minutes. Further, for aesthetic flair, faded images 302 associated with the assortment of content 300 (e.g., album artwork) may be displayed in a playlist sidebar 260. For example, in certain embodiments, the faded images 302 may taper in fade (e.g., more faded images on the left side of the playlist sidebar 260 and less faded images on the right side of the playlist sidebar 260). While the current embodiment illustrates the faded images 302 occupying a top bar 304 in the playlist sidebar 260, the faded images may occupy other areas of the playlist sidebar 260. For example, in alternative embodiments, the faded images 302 may occupy an entire background of the playlist sidebar 260

Figure 8:
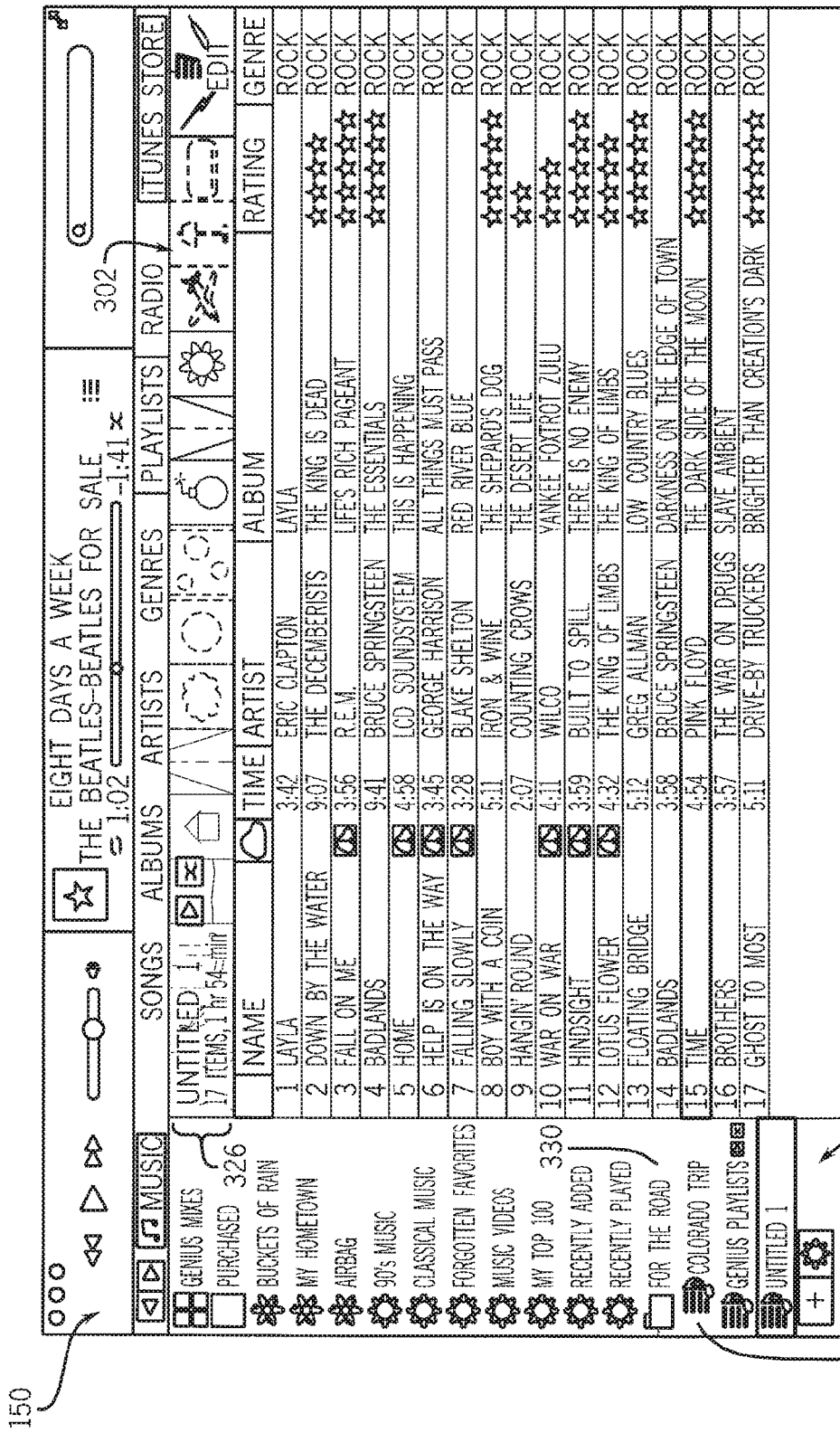
FIG. 8 is a view illustrating an example of the playlist screen of FIG. 4 after the playlist has been renamed and content has been added to the playlist.

Because of the large amount of digital content available and the different compilations of content that may be desired, the number of playlists may be quite large. Accordingly, it may be desirable to organize playlists. FIG. 8 is a view illustrating an example of the playlist screen 150 of FIG. 4 where content has been associated with the playlist and a playlist folder 330 has been added for organization.

Because the playlist screen 150 now has associated content, the faded images 302 discussed in FIG. 7 are now available in the playlist screen 150. In the current embodiment, the faded images 302 occupy a top bar 326 of the playlist screen 150, but in alternative embodiments these faded images 302 could occupy any portion of a screen of the digital content player that is associated with a compilation of content. As previously discussed, the playlist screen includes an option to add a new playlist folder (e.g., option 134 of FIG. 3). Accordingly, when the user selects this option, a new folder may be added to the library sidebar 112. The newly created folder may be generated with a default title such as "Untitled 1." In some embodiments, the content player may automatically provide a prompt to change the default folder name. In the current example, the user has added a "For the Road" folder 330 to bundle all playlists associated with road trips. The user may then associate playlists with the folder 330 by dragging the playlist over the folder 330 in the library sidebar 112. For example, the user has dragged the "Colorado Trip" playlist 332 into the "For the Road" playlist folder 330.

Figure 9:
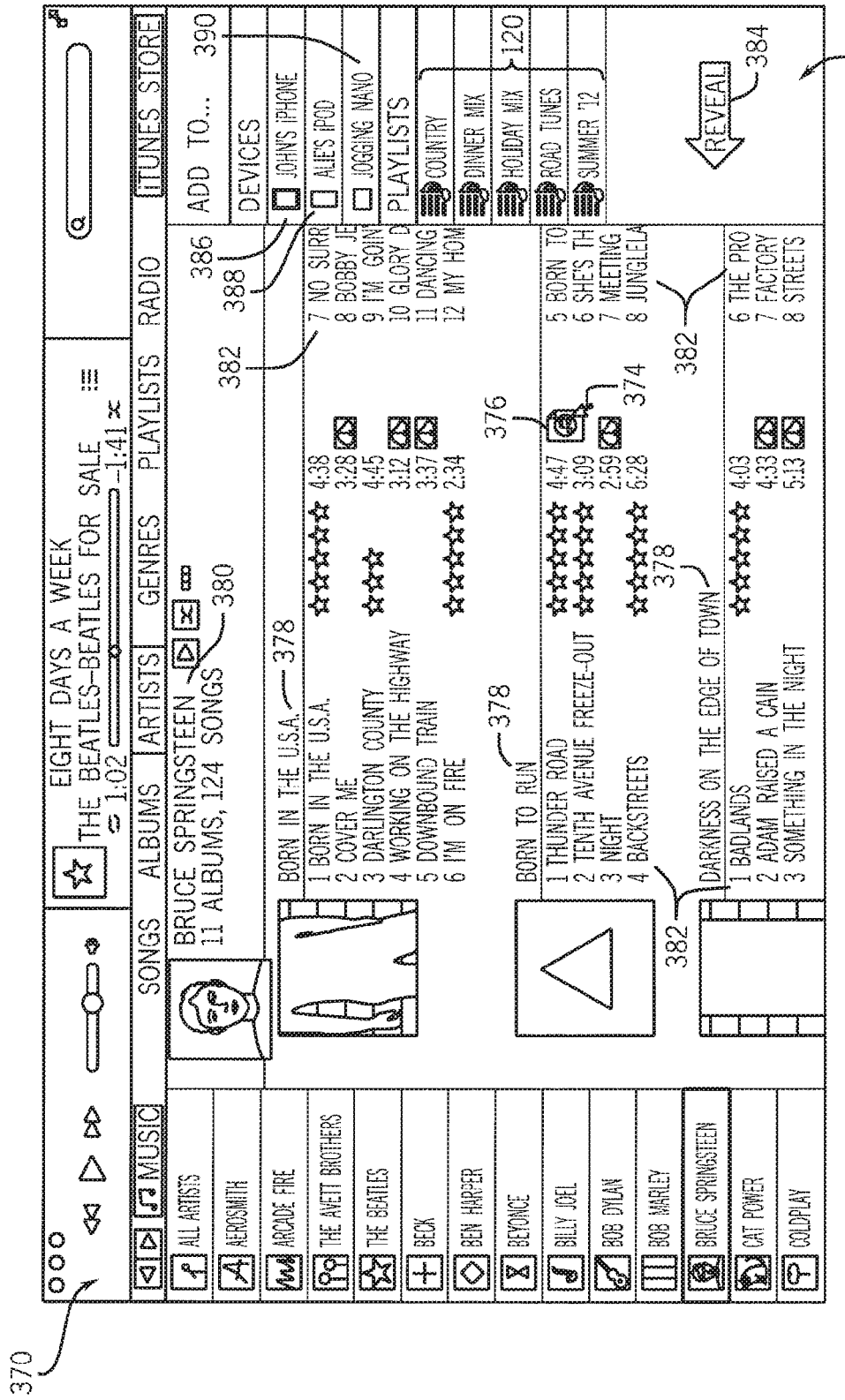
FIG. 9 is a view illustrating an "Add to" toolbar (e.g. a sidebar), in accordance with an embodiment.

Having now discussed generating and editing playlists through edit menus and the playlist sidebar 260, the discussion turns to an "Add to" sidebar that may provide access to the playlist sidebar 260. FIG. 9 is a view 370 illustrating an "Add to" sidebar 372, in accordance with an embodiment. Initially, the "Add to" sidebar 372 may be hidden from a user. When a user drags content in the view 370, it may typically be an indication that the user desires to place the content in a new location. Accordingly, the "Add to" sidebar may be displayed upon detecting that a user is dragging content in the digital content player. For example, as indicated by the pointer 374 holding the content icon 376, the user is currently dragging content or a compilation of content (e.g., dragging a compilation of album content by dragging an album name 378, dragging a compilation of artist content by dragging an artist name 380, or dragging a piece of content by dragging a song title 382). Accordingly, any reference to dragging content or a compilation of content described herein may relate to dragging the content icon 376 associated with the content or compilation.

As the user drags the content or compilation of content, the digital content player may detect the content or compilation of content associated with the dragging. The digital content player may then determine the objects where the dragged content or compilation may be placed. Based upon this determination, the digital content player may reveal the "Add to" sidebar 372. For example, the "Add to" sidebar may slide out from the right of the view 370, as indicated by the arrow 384.

As discussed above, many electronic devices may be associated with the digital content player. For example, an iPhone®, iPad®, or iPod® by Apple, Inc. may be associated with the digital content player, such that content accessible by the digital content player may be added to the associated electronic devices. In the current example, an iPhone® named "John's iPhone" 386, an iPod® named "Allie's iPod" 388, and an iPod Nano® named "Jogging Nano" 390 are associated with the digital content player. Each of these devices associated with digital content player are enabled to store digital content and thus may be determined to be objects where the dragged content or compilation may be placed. Further, manually customized playlists 120 may be objects where the dragged content or compilations may be placed. Accordingly, the digital content player may provide each of the devices and the manually customized playlists 120 in the "Add to" sidebar 372. The automatically generated playlists, devices without sufficient storage, and/or any read only devices associated with the digital content player may not be able to receive the dragged content. Accordingly, these objects are not provided in the "Add to" toolbar (e.g., sidebar 372).

Figure 10:
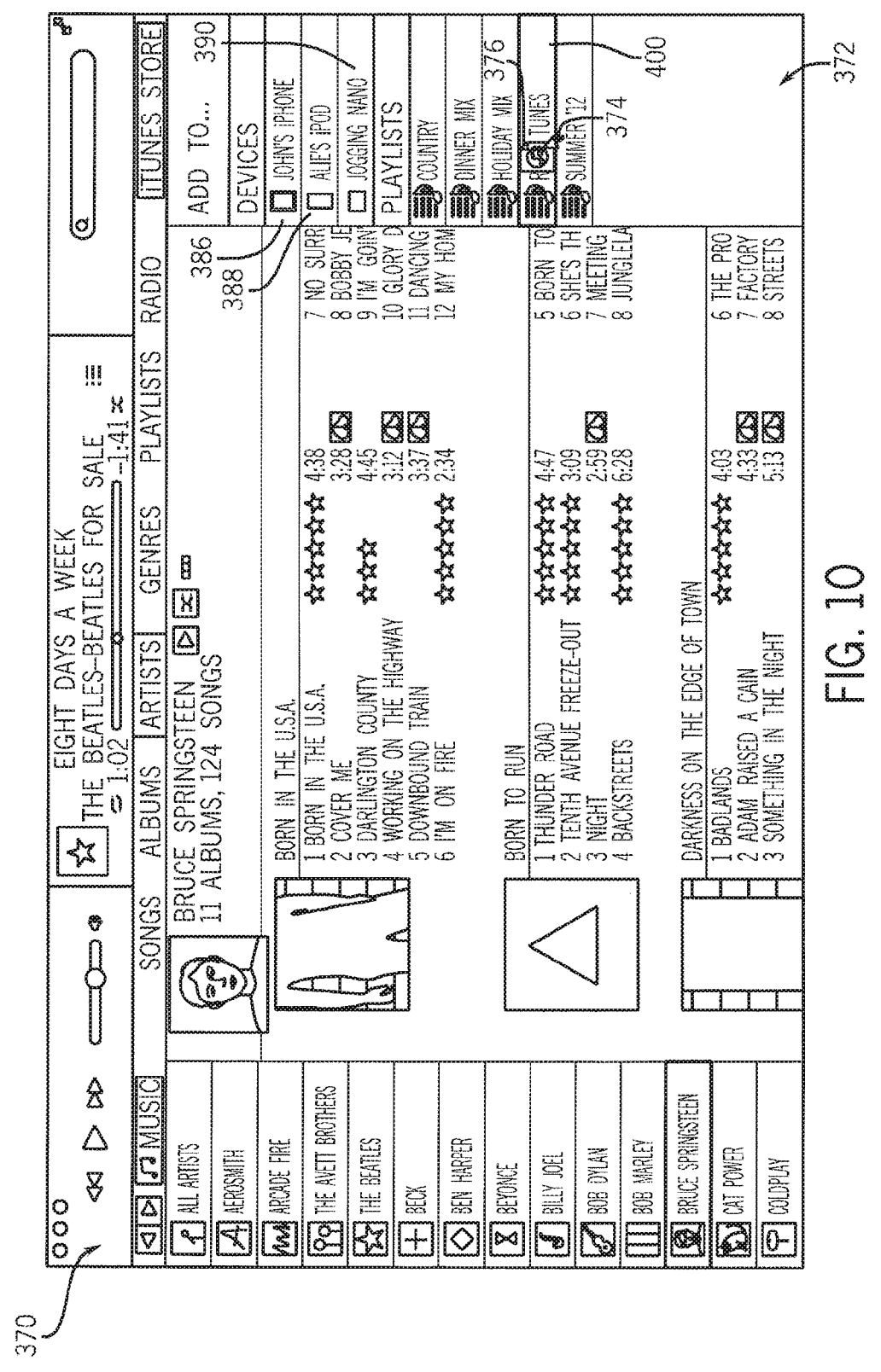

If the user releases the dragged content or compilation in an area that is not over one of the provided objects, the content player may determine that the user does not wish to store the content or compilation in an alternate location. Thus, the content player may hide the "Add to" sidebar 372. However, when the user drags the content icon 376 over an object in the "Add to" sidebar, the content player may determine that the user desires to associate the content or compilation with the object. For example, FIG. 10 illustrates content added to a previously created playlist via the "Add to" sidebar 372 of FIG. 9. As indicated by the pointer 374, the user has dragged the content icon 376 over a "Road Tunes" playlist option 400. Accordingly, the digital content player may determine that the user desires to associate the dragged content or compilation with the "Road Tunes" playlist. If the user releases the content icon 376 over the provided option relating to the object (e.g., the "Road Tunes" playlist option 400), the digital content player may place the content or compilation in a default location within the object (e.g., the "Road Tunes" playlist). For example, the digital content player may place the content or compilation at the beginning of the playlist before any other content that is stored in the playlist or at the end of the playlist after all other content that is stored in the playlist.

Figure 11:
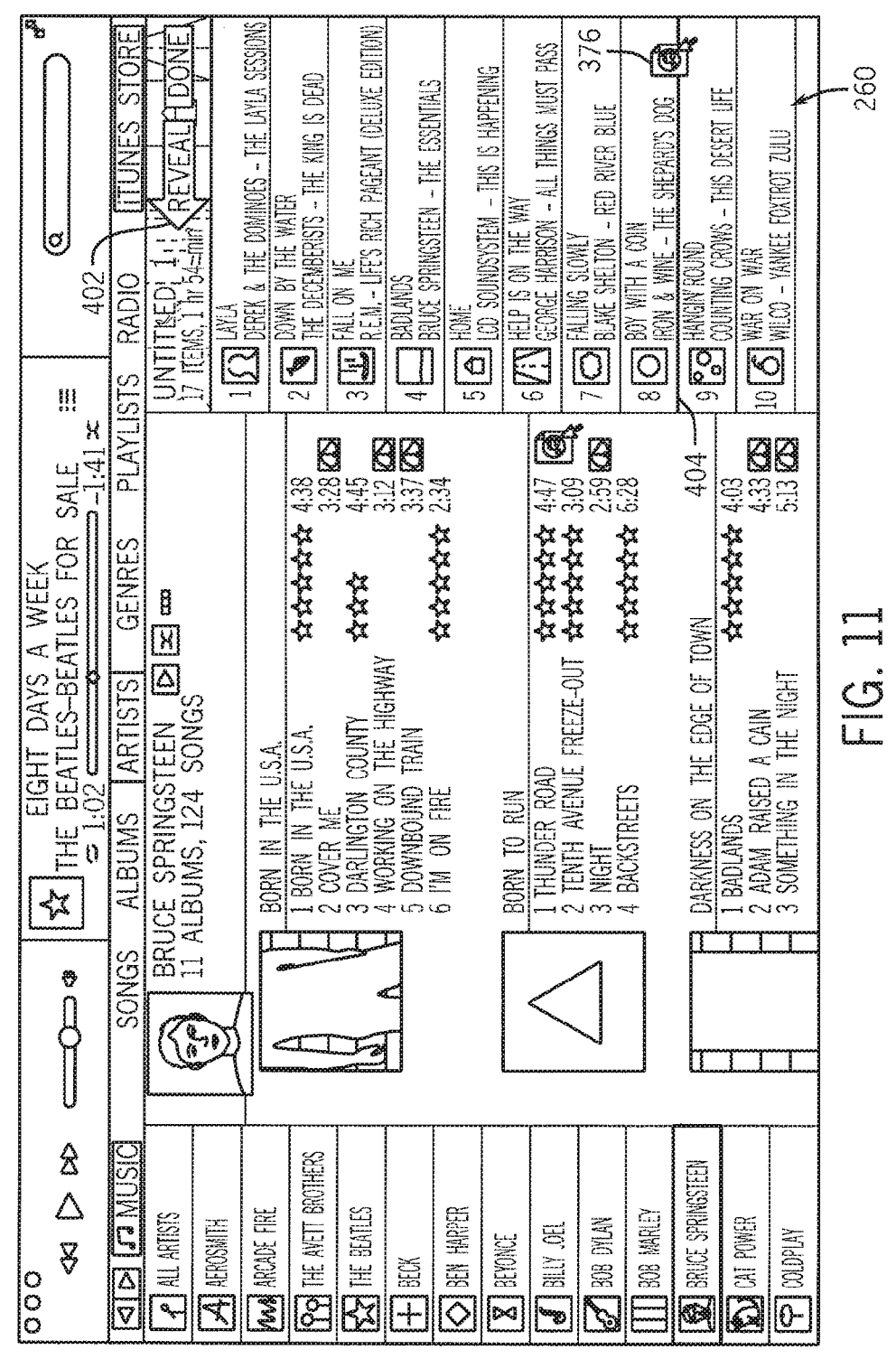

If the user hovers over the option associated with the object (e.g., the "Road Tunes" playlist option 400) additional options may be presented to the user. FIG. 11 is a view of the playlist sidebar of FIG. 6, provided to the user based upon the user's interactions with the "Add to" sidebar 372 of FIG. 10. For example, assuming the user did not release the content icon 376 over the option 400 of FIG. 10, the playlist sidebar 260 of FIG. 11 associated with the "Road Tunes" playlist option 400 of FIG. 10 is revealed to the user (e.g., by sliding out from the right of the view, as indicated by arrow 402 of FIG. 11). As may be appreciated, by presenting the playlist sidebar 260 of FIG. 11, the user may dictate the positioning of the content or compilation. In FIG. 11, for example, as the user drags the content icon 376 in the playlist sidebar 260, a positioning bar 404 may be provided that represents where the content or compilation will be placed if the user releases the content icon 376. In the current example of FIG. 11, the user is positioning the content or compilation between "Boy With a Coin" and "Hangin' Round."

The hovering actions on the "Add to" sidebar 372 of FIG. 10 are not only useful for positioning content within a playlist. If the user had hovered the content icon 376 over any of the devices 386, 388, or 390, the user would have been provided with storage locations for the corresponding device. For example, if the user hovered over the option 386 for John's iPhone, the user would have been presented with folders and/or playlists associated with John's iPhone where the content could be stored. The user would then be free to place the content in the folder (e.g., a music folder on an iPhone®) or could hover over the playlist to receive a playlist sidebar 260 of FIG. 11 associated with the playlist on John's iPhone, such that the content order could be configured by the user.

Figure 12:
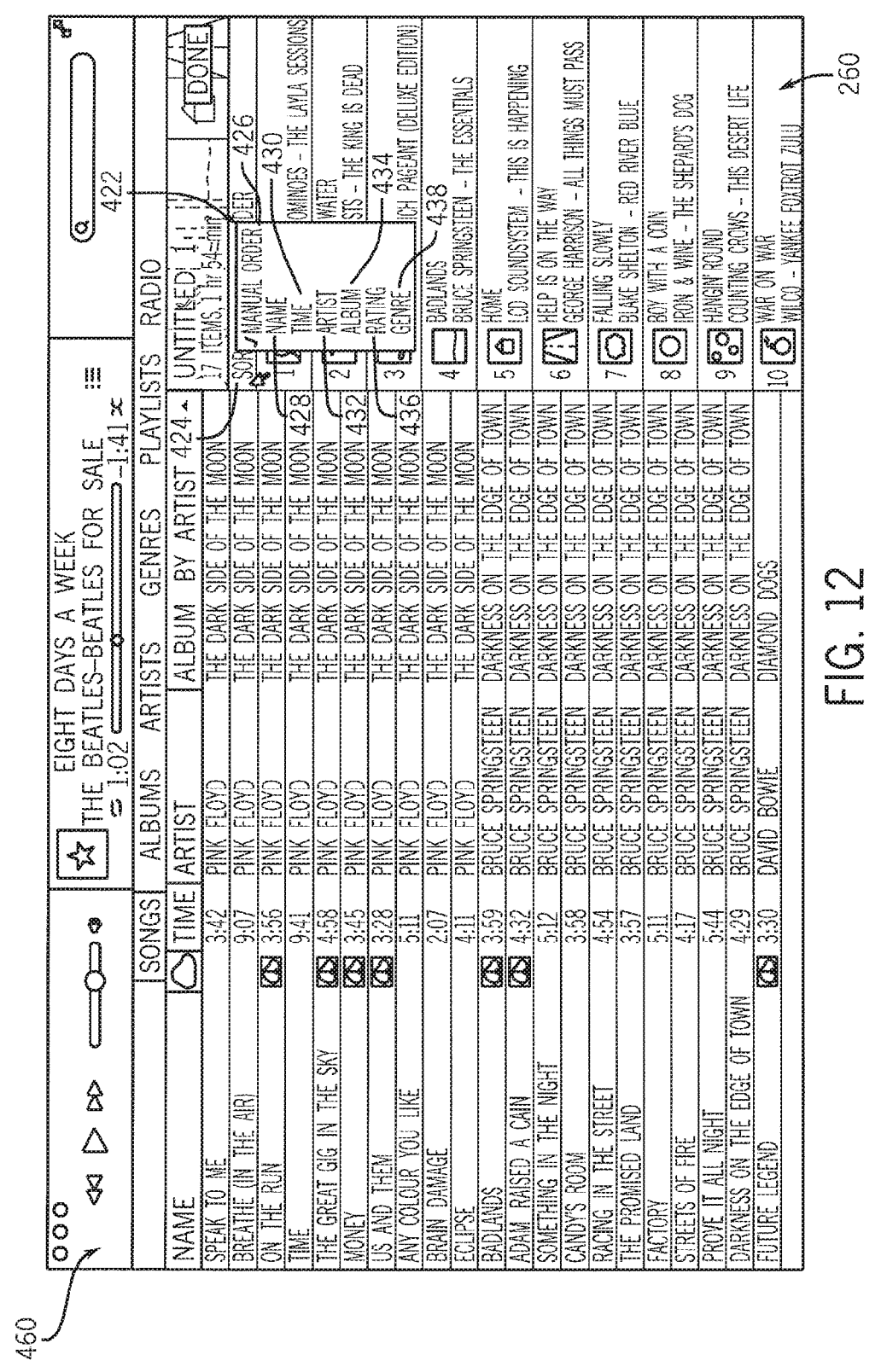

In some embodiments, if the user decides to change the order of content in a playlist, a sorting menu may be provided. FIG. 12 illustrates a view 420 where a sort menu 422 for the playlist sidebar 260 is presented to the user upon selecting a "Sort by" option 424. Occasionally, a user may desire to change the order of content within a playlist. This may be facilitated in several ways. First, as previously discussed with regards to FIG. 11, content within the playlist sidebar 260 can be dragged to different locations within the playlist sidebar 260. When the user desires this type of ordering, the user may select a "Manual Order" option 426 from the sort menu 422. If the user desires an automatic sort of the content within the playlist, the user may select automatic sorting options from the sort menu 422. For example, the user may select a name sort option 428 that instructs the content player to sort the playlist alphabetically by title of the content. A time sort option 430 may sort the content based on time (e.g., shortest first or shortest last sorting). Further an artist sort option 432 may sort all of the content in the playlist alphabetically passed on the artist name. An album sort option 434 may sort the content alphabetically based upon album title. A rating sort option 436 sorts based upon an ratings provided by the user or others regarding the content and a genre sort option 438 sorts the content alphabetically based on genre.

Figure 13:
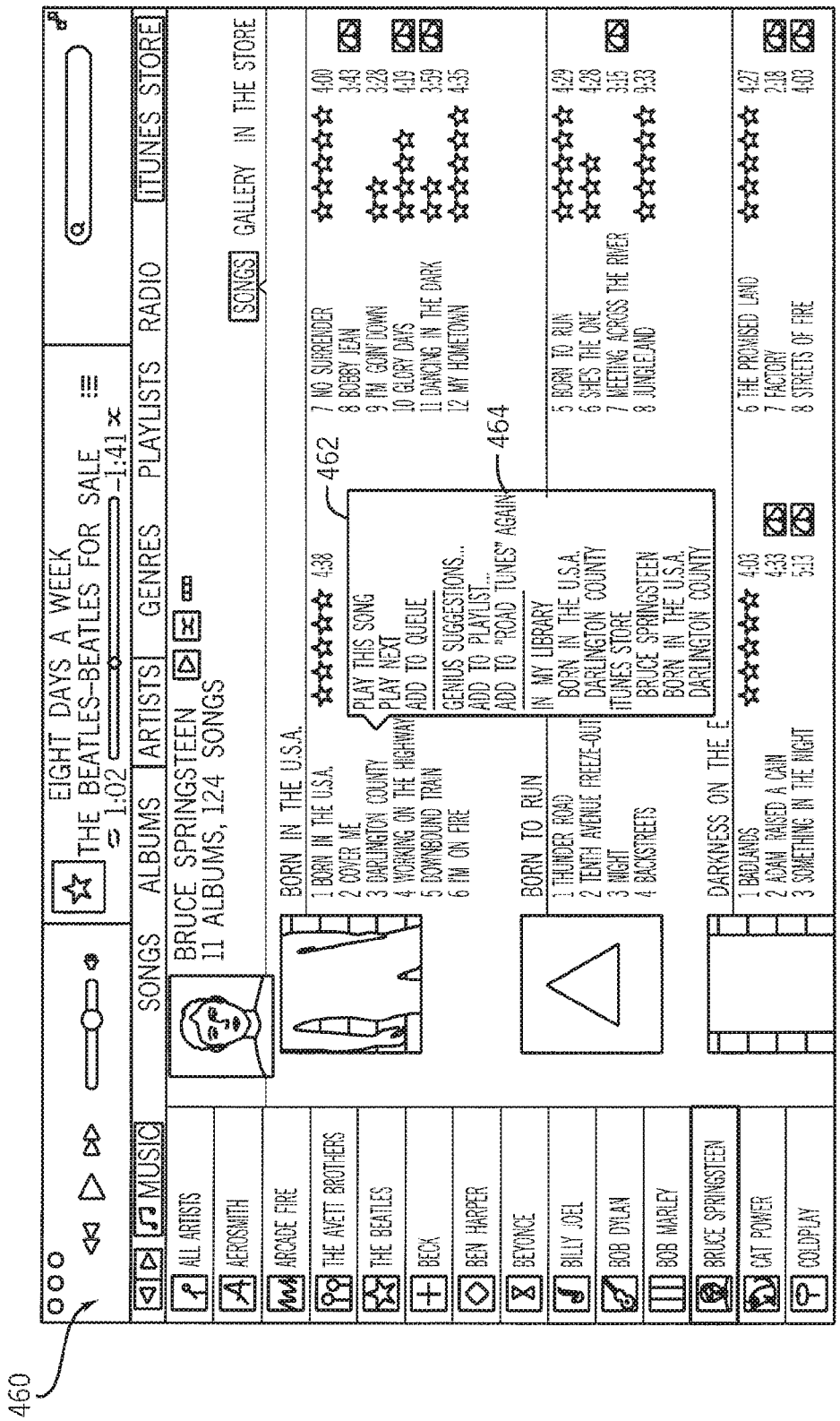
FIG. 13 is a view of a quick menu with learned playlist actions, in accordance with an embodiment.
Figure 14:
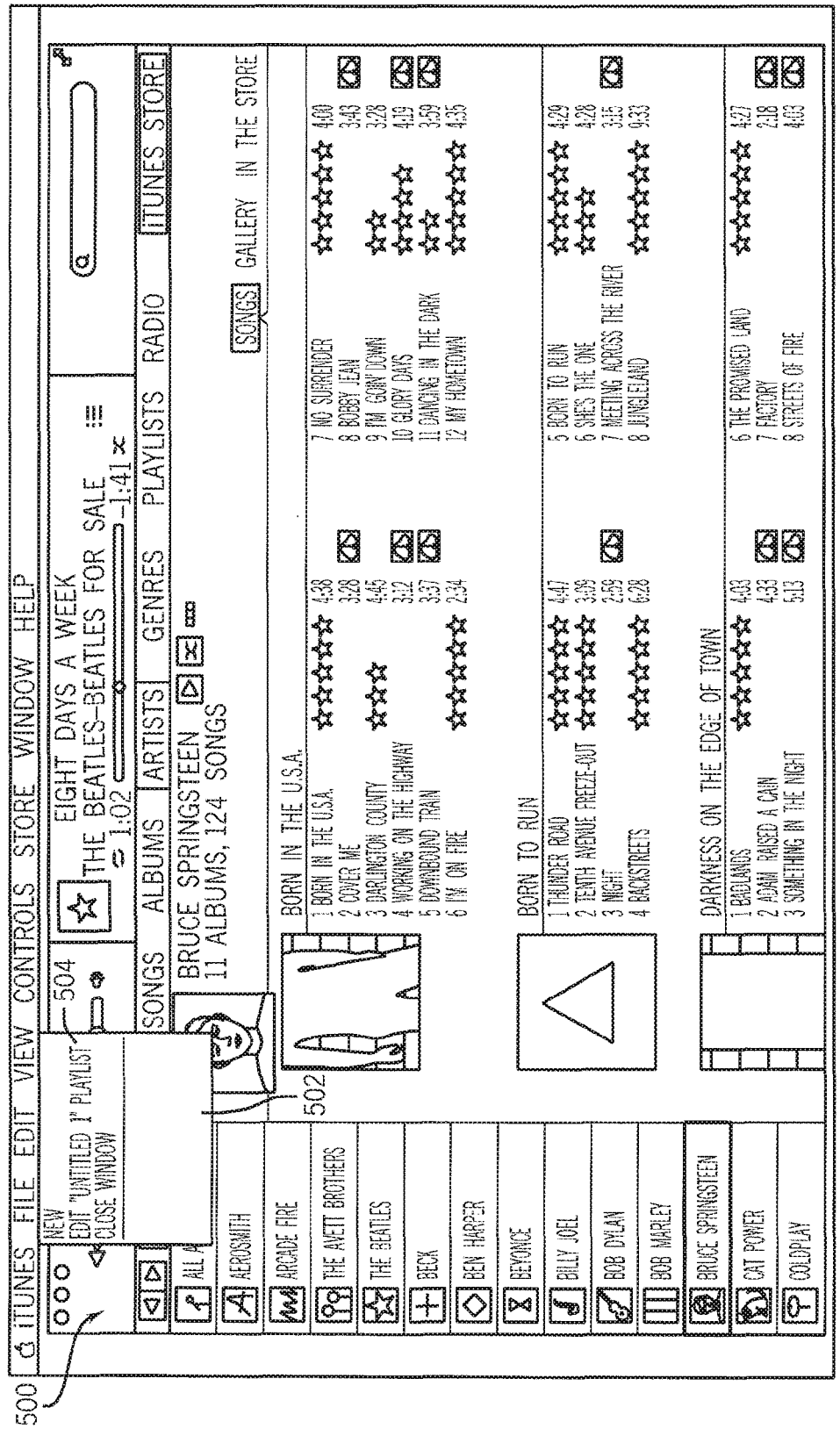
FIG. 14 is a view illustrating a toolbar menu with learned playlist actions, in accordance with an embodiment.

As previously discussed, the digital content player may predict playlist actions based upon previous playlist activities that have occurred. For example, FIG. 13 is a view 460 of a quick menu 462 providing predicted playlist actions 464, in accordance with an embodiment. FIG. 14 is a view 500 illustrating a toolbar menu 502 with predicted playlist actions 504, in accordance with an embodiment.

The digital content player may remember activities related to playlist generation or editing. For example, a user who has recently created and/or edited a playlist may be more likely to continue to want to edit the playlist. Accordingly, the content player may provide predicted playlist options based upon a history of activities associated with the playlists. Accordingly, the content player may remember activity history (e.g., the most recently created and/or edited playlists). Further, the content player may determine a time period that has elapsed since creating and/or editing the playlists based upon the activity history. This information may be used to present playlist options to a user. In one embodiment, the most recently added and/or the most recently edited playlist will be determined to be the most likely candidate for additional editing. Accordingly, an edit option for that specific playlist may be offered as an option, reducing the number of "click-throughs" needed to edit the playlist. In some embodiments, the elapsed time between creation and/or edits of the playlist may determine whether an option is presented to the user. For example, in some embodiments, if the elapsed time is within a specific threshold, an option may be presented to the user. Otherwise, a predicted option is not presented to the user.

As illustrated in FIG. 13, the quick menu 462 is presented to the user. In some embodiments, this quick menu 462 may be provided upon an alternate input selection (e.g., a right mouse click, a two-finger click of a touchpad, or an option key+mouse click). The content player may determine whether any predicted playlist options should be presented to the user (e.g., whether a playlist has been created and/or edited within a certain threshold or if there is a most recently added and/or edited playlist available). If the content player determines that such a predicted playlist option exists, the option is added to the quick menu 462. For example, in the current example, because the user has recently modified the "Road Tunes" playlist, the option 464 is provided in the quick menu 462 to add the selected song to the "Road Tunes" playlist. This additional option 464 reduces the number of clicks needed to add content to the "Road Tunes" playlist. Because content is currently selected and the content is not already in the "Road Tunes" playlist, the predicted option is to add the selected content to the playlist. If the content were already in the "Road Tunes" playlist, the "add" option would not be presented. Instead, in some embodiments, a remove option may be presented.

If no content is selected when the predicted option is requested, a predicted option might be more broad. For example, the predicted option may be to edit the "Road Tunes" playlist, rather than add or remove a particular piece of content. For example, in the embodiment illustrated in FIG. 14, predicted options may be added to a toolbar menu. The toolbar menu might not be associated with a particular piece of content. Accordingly, as illustrated in FIG. 14, an edit "Road Tunes" Playlist option 504 is presented to the user. When selected, this option will reveal the playlist sidebar 260 in a similar manner as discussed regarding FIG. 6.

As may be appreciated, by implementing the techniques described herein, graphical user-interfaces used in electronic devices may be greatly enhanced. For example, playlists may be accessed, edited, and created in a more convenient manner. Through providing the playlist side bar, enhanced playlist cues, and suggestions of playlist actions, the layout may be more appealing to the user, thus, creating an enhanced user experience.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
at an electronic device with a display:
displaying, on the display, a first user interface of an application, the first user interface including a plurality of content items;
detecting an input dragging a first content item, in the plurality of content items, across the first user interface; and,
in response to detecting the input dragging the first content item across the first user interface, displaying a sidebar that contains objects in which the first content item is configured to be placed.

2. The method of claim 1, wherein the application manages media content items and the content items include media content items.

3. The method of claim 1, wherein the objects in which the first content item is configured to be placed include objects that correspond to other electronic devices.

4. The method of claim 1, wherein the objects in which the first content item is configured to be placed include objects that correspond to playlists.

5. The method of claim 1, wherein the sidebar is displayed over the first user interface.

6. The method of claim 1, including:
in response to detecting the input dragging the first content item across the first user interface, determining objects in which the first content item is configured to be placed and displaying the sidebar based on this determination.

7. The method of claim 1, including:
detecting an input that releases the first content item while the first content item is not over any objects in the sidebar; and,
in response to detecting the input that releases the first content item while the first content item is not over any objects in the sidebar, hiding the sidebar.

8. The method of claim 1, including:
detecting an input that releases the first content item while the first content item is over a first object in the sidebar; and,
in response to detecting the input that releases the first content item while the first content item is over a first object in the sidebar, placing the first content item within the first object.

9. The method of claim 8, wherein the first content item is placed at a default location within the first object.

10. The method of claim 1, including:
detecting an input that releases the first content item; and,
in response to detecting the input that releases the first content item:
in accordance with a determination that, when released, the first content item is not over any objects in the sidebar, hiding the sidebar; and
in accordance with a determination that, when released, the first content item is over a first object in the sidebar, placing the first content item within the first object.

11. The method of claim 1, including:
detecting an input that hovers the first content item over a first object in the sidebar; and,
in response to detecting the input that hovers the first content item over the first object in the sidebar, displaying in the sidebar a user interface for positioning and/or storing the first content item within the first object.

12. The method of claim 11, wherein display, in the sidebar, of the user interface for positioning and/or storing the first content item within the first object replaces display, in the sidebar, of the objects in which the first content item is configured to be placed.

13. The method of claim 1, wherein:
the sidebar is displayed in a first region of the display in response to detecting the input dragging the first content item across the first user interface, and
dragging the first content item occurs in a portion of the first user interface that is displayed outside of the first region of the display.

14. An electronic device, comprising:
a display;
one or more processors;
memory; and
one or more programs, wherein the one or more programs are stored in the memory and configured to be executed by the one or more processors, the one or more programs including instructions to:
display, on the display, a first user interface of an application, the first user interface including a plurality of content items;
detect an input dragging a first content item, in the plurality of content items, across the first user interface; and,
in response to detecting the input dragging the first content item across the first user interface, display a sidebar that contains objects in which the first content item is configured to be placed.

15. A non-transitory computer readable storage medium storing one or more programs, the one or more programs comprising instructions, which when executed by an electronic device with a display, cause the electronic device to:
display, on the display, a first user interface of an application, the first user interface including a plurality of content items;
detect an input dragging a first content item, in the plurality of content items, across the first user interface; and,
in response to detecting the input dragging the first content item across the first user interface, display a sidebar that contains objects in which the first content item is configured to be placed.

16. The device of claim 14, wherein the application manages media content items and the content items include media content items.

17. The device of claim 14, wherein the objects in which the first content item is configured to be placed include objects that correspond to other electronic devices.

18. The device of claim 14, wherein the objects in which the first content item is configured to be placed include objects that correspond to playlists.

19. The device of claim 14, wherein the sidebar is displayed over the first user interface.

20. The device of claim 14, including instructions for:
in response to detecting the input dragging the first content item across the first user interface, determining objects in which the first content item is configured to be placed and displaying the sidebar based on this determination.

21. The device of claim 14, including instructions for:
detecting an input that releases the first content item while the first content item is not over any objects in the sidebar; and,
in response to detecting the input that releases the first content item while the first content item is not over any objects in the sidebar, hiding the sidebar.

22. The device of claim 14, including instructions for:
detecting an input that releases the first content item while the first content item is over a first object in the sidebar; and,
in response to detecting the input that releases the first content item while the first content item is over a first object in the sidebar, placing the first content item within the first object.

23. The device of claim 22, wherein the first content item is placed at a default location within the first object.

24. The device of claim 14, including instructions for:
detecting an input that releases the first content item; and,
in response to detecting the input that releases the first content item:
in accordance with a determination that, when released, the first content item is not over any objects in the sidebar, hiding the sidebar; and
in accordance with a determination that, when released, the first content item is over a first object in the sidebar, placing the first content item within the first object.

25. The device of claim 14, including instructions for:
detecting an input that hovers the first content item over a first object in the sidebar; and,
in response to detecting the input that hovers the first content item over the first object in the sidebar, displaying in the sidebar a user interface for positioning and/or storing the first content item within the first object.

26. The device of claim 25, wherein display, in the sidebar, of the user interface for positioning and/or storing the first content item within the first object replaces display, in the sidebar, of the objects in which the first content item is configured to be placed.

27. The device of claim 14, wherein:
the sidebar is displayed in a first region of the display in response to detecting the input dragging the first content item across the first user interface, and
dragging the first content item occurs in a portion of the first user interface that is displayed outside of the first region of the display.

28. The storage medium of claim 15, wherein the application manages media content items and the content items include media content items.

29. The storage medium of claim 15, wherein the objects in which the first content item is configured to be placed include objects that correspond to other electronic devices.

30. The storage medium of claim 15, wherein the objects in which the first content item is configured to be placed include objects that correspond to playlists.

31. The storage medium of claim 15, wherein the sidebar is displayed over the first user interface.

32. The storage medium of claim 15, including instructions, which when executed by the electronic device, cause the electronic device to:
in response to detecting the input dragging the first content item across the first user interface, determine objects in which the first content item is configured to be placed and display the sidebar based on this determination.

33. The storage medium of claim 15, including instructions, which when executed by the electronic device, cause the electronic device to:
detect an input that releases the first content item while the first content item is not over any objects in the sidebar; and,
in response to detecting the input that releases the first content item while the first content item is not over any objects in the sidebar, hide the sidebar.

34. The storage medium of claim 15, including instructions, which when executed by the electronic device, cause the electronic device to:
detect an input that releases the first content item while the first content item is over a first object in the sidebar; and,
in response to detecting the input that releases the first content item while the first content item is over a first object in the sidebar, place the first content item within the first object.

35. The storage medium of claim 33, wherein the first content item is placed at a default location within the first object.

36. The storage medium of claim 15, including instructions, which when executed by the electronic device, cause the electronic device to:
detect an input that releases the first content item; and,
in response to detecting the input that releases the first content item:
in accordance with a determination that, when released, the first content item is not over any objects in the sidebar, hide the sidebar; and
in accordance with a determination that, when released, the first content item is over a first object in the sidebar, place the first content item within the first object.

37. The storage medium of claim 15, including instructions, which when executed by the electronic device, cause the electronic device to:
detect an input that hovers the first content item over a first object in the sidebar; and,
in response to detecting the input that hovers the first content item over the first object in the sidebar, display in the sidebar a user interface for positioning and/or storing the first content item within the first object.

38. The storage medium of claim 36, wherein display, in the sidebar, of the user interface for positioning and/or storing the first content item within the first object replaces display, in the sidebar, of the objects in which the first content item is configured to be placed.

39. The storage medium of claim 15, wherein:
the sidebar is displayed in a first region of the display in response to detecting the input dragging the first content item across the first user interface, and
dragging the first content item occurs in a portion of the first user interface that is displayed outside of the first region of the display.

* * * * *